United States Patent
Lunardi et al.

(10) Patent No.: US 12,464,594 B2
(45) Date of Patent: Nov. 4, 2025

(54) NETWORK NODES AND METHODS IN A RADIO ACCESS NETWORK FOR IMPROVING THE RRC RESUME PROCEDURE

(71) Applicant: Telefonaktiebolaget LM Ericsson (PUBL), Stockholm (SE)

(72) Inventors: Luca Lunardi, Genoa (IT); Icaro L. J. da Silva, Solna (SE); Markus Drevö, Linköping (SE); Angelo Centonza, Granada (ES); Tahmineh Torabian Esfahani, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 469 days.

(21) Appl. No.: 17/792,776

(22) PCT Filed: Feb. 19, 2020

(86) PCT No.: PCT/SE2020/050192
§ 371 (c)(1),
(2) Date: Jul. 14, 2022

(87) PCT Pub. No.: WO2021/162597
PCT Pub. Date: Aug. 19, 2021

(65) Prior Publication Data
US 2023/0056267 A1 Feb. 23, 2023

Related U.S. Application Data

(60) Provisional application No. 62/976,575, filed on Feb. 14, 2020.

(51) Int. Cl.
*H04W 76/27* (2018.01)
*H04W 48/08* (2009.01)

(52) U.S. Cl.
CPC .......... *H04W 76/27* (2018.02); *H04W 48/08* (2013.01)

(58) Field of Classification Search
None
See application file for complete search history.

(56) References Cited

U.S. PATENT DOCUMENTS

2021/0204184 A1* 7/2021 Ohseki ................. H04W 36/08

FOREIGN PATENT DOCUMENTS

| EP | 3 373 692 A1 | 10/2016 |
| EP | 3 654 697 A1 | 5/2020 |

(Continued)

OTHER PUBLICATIONS

3GPP TS 38.300 v16.0.0; Technical Specification; 3rd Generation Partnership Project; Technical Specification Group Radio Access Network; NR; NR and NG-RAN Overall Description; Stage 2 (Release 16)—Dec. 2019.

(Continued)

*Primary Examiner* — Angela Nguyen
(74) *Attorney, Agent, or Firm* — Baker Botts L.L.P.

(57) ABSTRACT

A method performed by a first network node for assisting a second network node in resuming of a User Equipment, UE, in inactive state into connected state in a Radio Access Network, RAN. The first network node obtains (401) a Local RAN Node Identifier associated with a Public Land Mobile Network, PLMN, RAN Node ID, identifying the first network node. The first network node sends (402) the Local RAN node Identifier and associated PLMN RAN Node ID to be obtainable by the second network node. The first network node suspends (403) the UE from connected state into inactive state and sends an identifier to the UE. The identifier comprises a UE Context ID and the associated Local RAN Node Identifier. The UE Context ID identifies (Continued)

the UE context associated with the UE. The UE Context ID, Local RAN Node Identifier and associated PLMN RAN Node ID will assist the second network node to obtain the UE Context for the resuming of the UE into connected state, wherein a connection is to be provided by the second network node.

18 Claims, 14 Drawing Sheets

(56) References Cited

FOREIGN PATENT DOCUMENTS

| WO | 2017 085621 A1 | 11/2016 |
| WO | 2018 172943 A1 | 9/2018 |
| WO | 2018 229680 A1 | 12/2018 |
| WO | 2019 194733 A1 | 4/2019 |

OTHER PUBLICATIONS

3GPP TS 38.423 v16.0.0; Technical Specification; 3rd Generation Partnership Project; Technical Specification Group Radio Access Network; NG-RAN; Xn application protocol (XnAP) (Release 16)—Dec. 2019.

3GPP TSG-RAN WG2 Meeting #94; Nanjing, China; Source: ZTE; Title: Open issues for cIoT optimization (R2-164320)—May 23-27, 2016.

3GPP TSG-RAN3 Meeting #96; Hangzhou, China; Title: NG contect fetch for inactive mode UE; Source: Huawei (R3-171550)—May 15-19, 2017.

PCT International Search Report issued for International application No. PCT/SE2020/050192—Nov. 6, 2020.

PCT Written Opinion of the International Searching Authority issued for International application No. PCT/SE2020/050192—Nov. 6, 2020.

* cited by examiner

NETWORK NODES AND METHODS IN A RADIO ACCESS NETWORK FOR IMPROVING THE RRC RESUME PROCEDURE

PRIORITY

This nonprovisional application is a U.S. National Stage Filing under 35 U.S.C. § 371 of International Patent Application Serial No. PCT/SE2020/050192 filed Feb. 19, 2020 and entitled "Network Nodes and Methods in a Radio Access Network for Improving the RRC Resume Procedure" which claims priority to U.S. Provisional Patent Application No. 62/976,575 filed Feb. 14, 2020 both of which are hereby incorporated by reference in their entirety.

TECHNICAL FIELD

Embodiments herein relate to a first network node, a second network node and methods therein. In particular, the embodiments herein refer to resuming a User Equipment (UE) in inactive state into connected state in a Radio Access Network (RAN).

BACKGROUND

In a typical wireless communication network, wireless devices, also known as wireless communication devices, mobile stations, stations (STA) and/or User Equipment (UE), communicate via a Local Area Network such as a W-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a W-Fi access point or a radio base station (RBS), which in some networks may also be denoted, for example, a NodeB, eNodeB (eNB), or gNB as denoted in 5G. 5G is also referred to as Next Generation (NG). A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE or gNBs in 5G, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

NR Radio Resource Control (RRC); RRC Inactive State

For NG Radio Access (NR) 3GPP has defined three RRC states for UE state machine, namely: RRC_IDLE, RRC_CONNECTED and RRC_INACTIVE. A UE state machine and state transition in NR is shown in FIG. 1.

Provided that a Signaling Radio Bearer (SRB)2 and at least one Dedicated Radio Bearer (DRB) are setup for a UE, an NG-RAN, such as e.g. a gNB, may initiate a state transition from RRC_CONNECTED to RRC_INACTIVE or from RRC_INACTIVE back to RRC_CONNECTED when the UE initiates an RRC Resume procedure.

The state transitions just mentioned may be triggered when a source gNB initiates an RRC connection release procedure and sends to the UE an RRC Release message which includes the suspension of the established radio bearers.

The state transition of the UE from RRC_INACTIVE to RRC_CONNECTED may be triggered by different reasons. In all cases, this will result in an RRC Resume procedure (Resume), initiated by the UE. If the reason for Resume is the need to transfer data, or NAS signaling, towards the UE in downlink, the Resume procedure is preceded by a RRC Paging initiated by the NG-RAN.

The UE starts the Resume procedure by sending an RRCResumeRequest, on logical channel Common Control Channel (CCCH), or an RRCResumeRequest1, on logical channel CCCH1, depending respectively on absence or presence of useFullResumeID Information element (IE) in a System Information Block (SIB)1 of the serving NR cell. Note that a UE may attempt a Resume towards an NR cell controlled by the same source gNB (or old gNB) holding the UE Context or a different, such as a target gNB (or new gNB). The source gNB and the target gNB may or not have an established XnAP connection between them. XnAP is the interface between gNBs.

SIB1

SIB1 comprises information relevant when evaluating if a UE is allowed to access a cell and defines the scheduling of other system information. It also comprises radio resource configuration information that is common for all UEs and barring information applied to the unified access control.

In the context of this document, relevant parts provided in comprise:

cellAccessRelatedInfo, which provides information related to RAN Notification Area (RNA), i.e. trackingAreaCode, RAN Area Code (RANAC), cellIdentity.

```
SIB1 message
- ASN1START
-- TAG-SIB1-START
SIB1 ::=        SECENCE {
    cellSelectionInfo           SEQUENCE {
        q-RxLevMin                  Q-Rxlevmin,
        q-RxLevMinOffset            INTEGER (1..8)      OPTIONAL,    -- Need S
        q-RxLevMinSUL               Q-RxLevMin          OPTIONAL,    -- Need R
        q-QualMin                   Q-QualMin           OPTIONAL,    -- Need S
        q-QualMinOffset             INTEGER (1..8)      OPTIONAL     -- Need S
```

-continued

```
    }                                                                     OPTIONAL, -- Cond Standalone
    cellAccessRelatedInfo              CellAccessRelatedInfo,
    connEstFailureControl              ConnEstFailureControl              OPTIONAL,   -- Need R
    si-SchedulingInfo                  SI-SchedulingInfo                  OPTIONAL,   -- Need R
    servingCellConfigCommon            ServingCellConfigComonSIB          OPTIONAL,   -- Need R
    ims-EmergencySupport               ENUMERATED {true}                  OPTIONAL,   -- Need R
    eCallOverIMS-Support               ENUMERATED {true}                  OPTIONAL,   -- Cond Absent
    ue-TimersAndConstants              UE-TimersAndConstants              OPTIONAL,   -- Need R
    usc-BarringInfo                    SEQUENCE {
        uac-BarringForCommon               UAC-BarringPerCatlist          OPTIONAL,   -- Need S
        uac-BarringPerPLMN-List            UAC-BarringPerPLMN-List        OPTIONAL,   -- Need S
        uac-BarringInfoSetList             UAC-BarringInfoSetList,
        uac-AccessCategory1-SelectionAssistanceInfo CHOICE {
            plmCommon                     UAC-AccessCategory1-SelectionAssistanceInfo,
            individualPLMNList            SEQUENCE (SIZE (2..maxPLMN)) OF UAC-AccessCategory1-
SelectionAssistanceInfo
        }                                                                 OPTIONAL    -- Need S
    }                                                                     OPTIONAL,   -- Need R
    useFullResumeID                    ENUMERATED {true}                  OPTIONAL,   --Need N
    lateNonCriticalExtension           OCTET STRING                       OPTIONAL,
    nonCriticalExtension               SEQUENCE{ }                        OPTIONAL
}
UAC-AccessCategory1-SelectionAssistanceInfo ::=    ENUMERATED {a, b, c}
-- TAG-SIB1-STOP
-- ASN1STOP
CellAccessRelatedInfo|
-- ASN1START
-- TAG-CELLACCESSRELATEDINFO-START
CellAccesssRelatedInfo      ::=        SEQUENCE {
    plmn-IdentityList                  PLMN-IdentityInfoList,
    cellReservedForOtherUse            ENUMERATED {true} OPTIONAL,                    -- Need R
    ...
}
-- TAG-CELLACCESSRELATEDINFO-STOP
-- ASN1STOP
PLMN-IdentityInfoList
-- ASNT1START
-- TAG-PLMN-IDENTITYINFOLIST-START
PLMN-IdentityInfoList ::=              SEQUENCE (SIZE (1..maxPLMN)) OF PLMN-IdentityInfo
PLMN-IdentityInfo ::=                  SEQUENCE {
    plmn-IdentityList                  SEQUENCE (SIZE (1..maxPLMN)) OF PLMN-Identity,
    trackingAreaCode                   TrackingAreaCode    OPTIONAL,    --Need R
    ranac                              RAN-AreaCode        OPTIONAL,    --Need R
    cellIdentity                       CellIdentity,
    cellReservedForOperatorUse         ENUMERATED {reserved, notReserved},
    ...
}
-- TAG-PLMN-IDENTITYINFOLIST-STOP
-- ASN1STOP
``` useFullResumeID

Indicates which resume identifier and Resume request message that should be used. A UE uses fullI-RNTI and RRCResumeRequest1 if the field is present, or shortI-RNTI and RRCResumeRequest if the field is absent.

RRC Release

To transition a UE to NR RRC_INACTIVE, one gNB, e.g. the source gNB prepares an RRC Release message which includes the suspend Configuration to support the UE upon RRC_INACTIVE state configuration.

In the context of this document, relevant information provided in RRC Release are:

full I-RNTI (fullI-RNTI): used to identify the suspended UE Context of a UE in RRC_INACTIVE (40 bits)

short I-RNTI (shortI-RNTI); used to identify the suspended UE Context of a UE in RRC_INACTIVE and using fewer bits compared to fullI-RNTI (24 bits)

ran-Notification Area Info (ran-NotificationAreaInfo): configuration of RAN Notification Area (RNA)

A RAN Notification Area (RNA) may comprise of one of the following (see RRCRelease message below for details):

1) A list of cells, maximum list size is 32 elements.

2) A list of RAN Area Codes (RANACs), maximum list size is 32 elements. Each RANAC has an associated Tracking Area Code (TAC).

3) A list of Tracking Area Codes.

Inactive Radio Network Temporary Identifier (I-RNTI)

The SuspendConfig IE in RRCRelease includes two types of Inactive Radio Network Temporary Identifiers (I-RNTI)s, respectively fullI-RNTI of 40 bits and shortI-RNTI of 24 bits.

I-RNTI-Value

The IE I-RNTI-Value is used to identify the suspended UE Context of a UE in RRC_INACTIVE.

I-RNTI-Value Information Element:

```
-- ASN1START
-- TAG-I-RNTI-VALUE-START
I-RNTI-Value::=                BIT STRING (SIZE (40))
-- TAG-I-RNTI-VALUE-STOP
-- ASN1STOP
```

Short I-RNTI-Value

An IE ShortI-RNTI-Value is used to identify a suspended UE Context of a UE in RRC_INACTIVE using fewer bits compared to I-RNTI-Value.

ShortI-RNTI-Value Information Element:

```
-- ASN1START
-- TAG-SHORTI-RNTI-VALUE-START
ShortI-RNTI-Value ::= BIT STRING (SIZE(24))
-- TAG-SHORTI-RNTI-VALUE-STOP
-- ASN1STOP
```

The UE may initiate the RRC connection Resume towards an NG-RAN node ("target", "new" or "second" NG-RAN node) other than the NG-RAN node hosting the UE Access Stratum (AS) Context ("source", "old" or "first" NG-RAN node). In this case, the I-RNTI included in a RRCResumeRequest or RRCResumeRequest1 message is used by the second NG-RAN node to identify the first NG-RAN node, so that the UE Access Stratum (AS) Context can be retrieved. In order to serve the UE, the second, i.e. target NG-RAN node needs to resolve the first, i.e. source, NG-RAN Node ID from the I-RNTI.

In a current version of the standard there is no agreed method to perform this task of identifying a source node based on a received I-RNTI. The only related information is the table C-1 of Annex C (Informative) in 3GPP TS 3GPP 38.300, that describes a possible reference profile for I-RNTI, with a partitioning of a 40 bit I-RNTI.

Three reference profiles are described, assuming that the 40 bits of I-RNTI are split in the following fields:

UE specific reference: reference to the UE Context within a logical NG-RAN node;

NG-RAN node address index: information to identify the NG-RAN node that has allocated the UE specific part;

NOTE: RAT-specific information may be introduced in a later release, containing information to identify the RAT of the cell within which the UE was sent to RRC_INACTIVE. This version of the specification only supports intra-RAT mobility of UEs in RRC_INACTIVE.

Public Land Mobile Network (PLMN)-specific information: information supporting network sharing deployments, providing an index to the PLMN ID part of the Global NG-RAN node identifier.

TABLE C-1

I-RNTI reference profiles

| Profile ID | UE specific reference | NG-RAN node address index (e.g., gNB ID, eNB ID) | RAT-specific information | PLMN-specific information | Comment |
|---|---|---|---|---|---|
| 1 | 20 bits (~1 million values) | 20 bits (~1 million values) | N/A | N/A | NG-RAN node address index may be very well represented by the LSBs of the gNB ID. This profile may be applicable for any NG-RAN RAT. |
| 2 | 20 bits (~1 million values) | 16 bits (65.000 nodes) | N/A | 4 bits (Max 16 PLMNs) | Max number of PLMN IDs broadcast in NR is 12. This profile may be applicable for any NG-RAN RAT. |
| 3 | 24 bits (16 million values) | 16 bits (65.000 nodes) | N/A | N/A | Reduced node address to maximise addressable UE contexts. This profile may be applicable for any NG-RAN RAT. |

NG-RAN Node ID

To uniquely identify the NG-RAN node, an attribute "Global gNB ID" can be used. As part of Global gNB ID, the gNB ID is defined as a bit string of variable length, from 22 to 32 bits, see e.g. 3GPP TS 38.413, 9.3.1.6.

The below IE is used to globally identify a gNB, see 3GPP TS 38.300.

| IE/Group Name | Presence | Range | IE type and reference | Semantics description |
|---|---|---|---|---|
| PLMN Identity | M | | 9.3.3.5 | |
| CHOICE gNB ID | M | | | |
| >gNB ID | | | | |
| >>gNB ID | M | | BIT STRING (SIZE(22 . . . 32)) | Equal to the leftmost bits of the NR Cell Identity IE contained in the NR CGI IE of each cell served by the gNB. |

A problem with existing solution is that it is not always possible to uniquely identify the NG-RAN node from the I-RNTI in a given target node where the UE is trying to resume.

SUMMARY

An object of embodiments herein is to improve the way of handling resumption of suspended UEs in a RAN network.

According to an aspect of embodiments herein, the object is achieved by a method performed by a first network node for assisting a second network node in resuming of a User Equipment, UE, in inactive state into connected state in a Radio Access Network, RAN. The first network node obtains a Local RAN Node Identifier associated with a Public Land Mobile Network, PLMN, RAN Node ID, identifying the first network node. The first network node sends the Local RAN Node Identifier and associated PLMN RAN Node ID to be obtainable by the second network node. The first network node suspends the UE from connected state into inactive state and sends an identifier to the UE. The identifier comprises a UE Context ID and a Local RAN Node Identifier. The UE Context ID identifies the UE Context associated with the UE. The UE Context ID, the Local RAN Node Identifier and associated PLMN RAN Node ID will assist the second network node to obtain the UE Context for the resuming of the UE into connected state, wherein a connection is to be provided by the second network node.

According to another aspect of embodiments herein, the object is achieved by a method performed by a second network node for enabling a resume of a User Equipment, UE, in inactive state into connected state in a Radio Access Network, RAN.

The second network node obtains a Local RAN Node Identifier, and associated Public Land Mobile Network, PLMN, RAN Node ID, identifying a first network node serving the UE in connected state before being suspended into inactive state.

The second network node receives a resume request message from the UE. The resume request message comprises an identifier comprising a UE Context ID and the associated Local RAN Node Identifier. The UE Context ID identifies a UE Context associated with the UE, and the Local RAN Node Identifier identifies the RAN node hosting the UE Context.

The second network node retrieves the Local RAN Node Identifier from the identifier.

The second network node obtains the associated PLMN RAN Node ID based on the Local RAN Node Identifier retrieved from the identifier.

Based on the obtained PLMN RAN Node ID, the second network node obtains the UE Context from the first network node.

According to another aspect of embodiments herein, the object is achieved by a first network node configured to assist a second network node in resuming a User Equipment, UE, in inactive state into connected state in a Radio Access Network, RAN. The first network node is further configured to:

Obtain a Local RAN Node Identifier, associated with a Public Land Mobile Network, PLMN, RAN Node ID, identifying the first network node, send the Local RAN Node Identifier and associated PLMN RAN Node ID to be obtainable by the second network node, and suspend the UE from connected state into inactive state and send to the UE an identifier adapted to comprise a UE Context ID and the associated Local RAN Node Identifier, which UE Context ID is adapted to identify the UE Context associated with the UE. The UE Context ID, Local RAN Node Identifier and associated PLMN RAN Node ID are adapted to assist the second network node to obtain the UE Context for the resuming of the UE into connected state, wherein a connection is to be provided by the second network node.

According another an aspect of embodiments herein, the object is achieved by a second network node configured to enable a resume of a User Equipment, UE, in inactive state into connected state in a Radio Access Network, RAN. The second network node is further configured to:

Obtain a Local RAN Node Identifier, and associated Public Land Mobile Network, PLMN, RAN Node ID adapted to identify a first network node serving the UE in connected state before being suspended into inactive state, receive a resume request message from the UE, which resume request message is adapted to comprise an identifier comprising a UE Context ID and the associated Local RAN Node Identifier, which UE Context ID is adapted to identify a UE Context associated with the UE, retrieve the Local RAN Node Identifier from the identifier, obtain the associated PLMN RAN Node ID based on the Local RAN Node Identifier retrieved from the identifier, and based on the obtained PLMN RAN Node ID, obtain the UE Context from the first network node.

Since the Local RAN Node Identifier and associated PLMN RAN Node ID is received from the first network node, the second network node can identify the first network node and then obtain the UE Context from the first network node. In this, it enables the second network node to resume the suspended UE into active state in a fast and efficient way. This results in that the way of handling resumption of UEs in a RAN network is improved.

An advantage of embodiments herein is that they provide a mechanism to resolve the identity of the first network node based on the identifier comprising a UE Context ID and the associated Local RAN Node Identifier provided by the UE when it initiates a RRC Connection Resume procedure.

DETAILED DESCRIPTION

Figure 1:
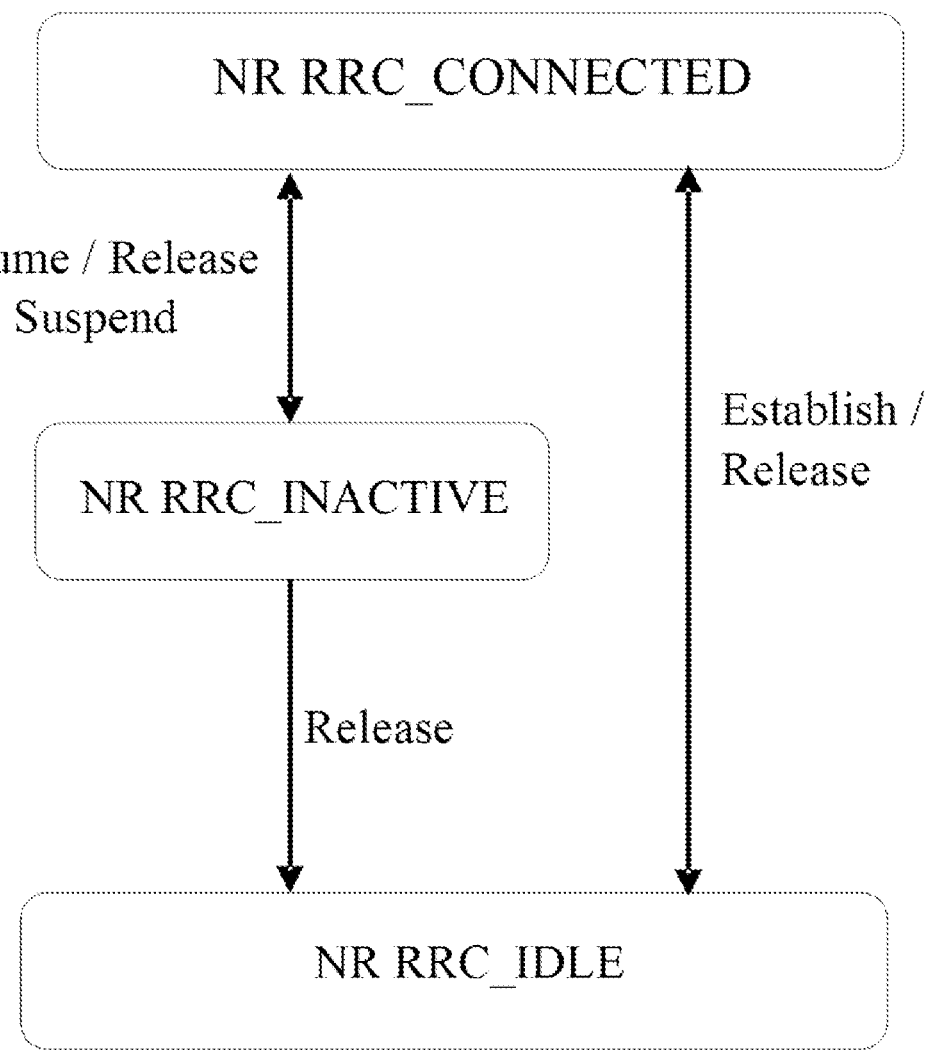
FIG. 1 is a block diagram illustrating prior art.

As part of developing embodiments herein some problems were identified and will be discussed below.

As mentioned above, a problem with existing solution is that it is not always possible for the target node to uniquely identify the source NG-RAN node from the I-RNTI.

Consequently, it is not obvious how the target node should verify whether a connection (e.g. via Xn Application Protocol (XnAP) link) is available towards the the source node hosting the UE AS Inactive Context. This issue is due to the fact that the maximum number of bits that can be used to encode the gNB ID, 32 bits, is larger than the number of bits available in the shortI-RNTI, 24 bits. In addition, part of the bits of the I-RNTI are needed to address multiple UEs and possibly different PLMNs. Hence, there is no guarantee that the target NG-RAN node can reach the old NG-RAN node, i.e. the node where the UE AS context is stored, since the old gNB ID cannot be retrieved without ambiguity from the I-RNTI transmitted by the UE in the resume request message. This also relates to the difficulty to serve a flexible number of UEs, since the number of bits of the I-RNTI left after the encoding of the old gNB ID may not always be sufficient.

This problem is particularly visible for the case of short I-RNTI where a gNB ID with length equal or higher than 24 bits does not fit. But the limitation exists also when the full I-RNTI is used. If 32 bits are used for the gNB ID, only 8 bits are left in the I-RNTI to reference the UE. In a best-case scenario where there is no need to distinguish PLMNs, this gives the possibility to address a maximum of $2^8=256$ users, which is a rather limited number of users.

The XnAP procedure Retrieve UE Context, see subclause 8.2.4 in 3GPP TS 38.423, is used to retrieve the UE Context from the old NG-RAN node and transfer it to the NG-RAN node where the RRC Connection has been requested to be established. The RETRIEVE UE CONTEXT REQUEST message includes, among others, the UE Context ID IE, as a pointer to the UE Context to be retrieved within the old node, e.g. the I-RNTI assigned by the source gNodeB that is being contacted, the allocated temporary C-RNTI, the cell PCI where the connection is being requested to be resume, and the Integrity protection IE, which for RRC Resume case is set to Resume MAC-I. The pointer to be included is the I-RNTI but nothing is mentioned concerning its structure i.e. what bits are referent to the node identity and what bits are referent to the UE identification. 3GPP TS 38.423 16.0.0 says that how the new NG-RAN node is able to resolve the old NG-RAN ID from the I-RNTI is a matter of proper configuration in the old and new NG-RAN node.

In addition to it, in current version of the standard 3GPP TS 38.423, one NG-RAN node can send information about its NR neighbour using the Neighbour Information N" IE. The Neighbour Information N" IE is optionally included under different parent IEs in the following XnAP messages:

XN SETUP REQUEST, as part of "List of Served Cells NR" IE and as part of "List of Served Cells E-UTRA" IE XN SETUP RESPONSE, as part of "List of Served Cells NR" IE and as part of "List of Served Cells E-UTRA" IE NG-RAN NODE CONFIGURATION UPDATE, as part of "Served Cells to Update NR" IE and as part of "Served Cells to Update E-UTRA" IE NG-RAN NODE CONFIGURATION UPDATE ACKNOWLEDGE", as part of "Served NR Cells" IE Embodiments herein provide methods executed at first and second network nodes to resolve, also referred to as identify, the first network node PLMN RAN Node ID from an identifier received from a UE, when resuming the UE from inactive state to connected state. The identifier may be referred to as an inactive identifier of the UE, e.g. an I-RNTI.

The methods use a mapping of the PLMN RAN Node ID of the first network node to a Local RAN Node Identifier of the first network node, e.g. maintained in a table that may be referred to as an Inactive Relation Table (IRT).

The methods may be performed in a distributed approach or a centralized approach.

Embodiments herein allow to use both full I-RNTI and short I-RNTI, and further allow a selection of the Local RAN Node Identifier for the first network node, to be used by the second network node to identify the first network node holding the UE Context from the identifier, e.g. an I-RNTI.

Figure 2:
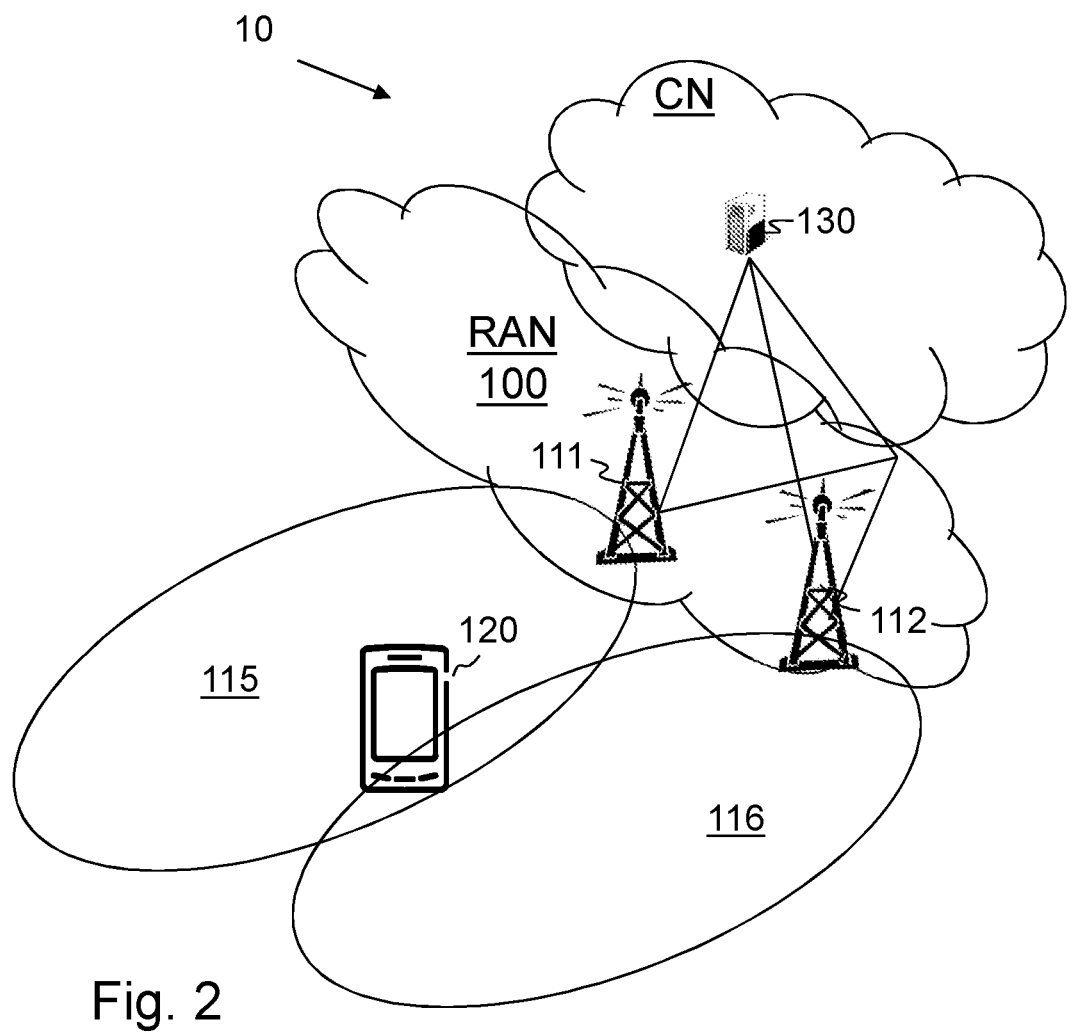
FIG. 2 is a schematic block diagram illustrating embodiments of a wireless communications network.

FIG. 2 depicts an example of a communications network 10 according to a first scenario in which embodiments herein may be implemented. The communications network 10 is a wireless communication network such as e.g. an 5GS, an LTE, E-UTRAN, WCDMA, GSM network, any 3GPP cellular network, Wimax, or any cellular network or system.

The communications network 10 comprises a Radio Access Network (RAN) and a Core Network (CN). The communication network 10 may use a number of different technologies, such as Long Term Evolution (LTE), LTE-Advanced, 5G, Wideband Code Division Multiple Access (WCDMA), Global System for Mobile communications/ Enhanced Data rate for GSM Evolution (GSM/EDGE), Worldwide Interoperability for Microwave Access (WiMax), or Ultra Mobile Broadband (UMB), just to mention a few possible implementations.

In the communication network 10, one or more UEs 120 may communicate via one or more Access Networks (AN), e.g. a RAN 100, to one or more CNs. The UE 120 may e.g. be a wireless device (WD), a mobile station, a non-access point (non-AP) STA, a STA, and/or a wireless terminal. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The UEs 120 may each be connected to one or more end stations such as one or more second end station. The second end station may e.g. be robots on a factory floor. In some embodiments, the UE 120 is connected to a group of end stations. One example of implementation may be a group of end stations being connected to a bridge, which bridge is connected to the UE 120.

The RAN comprises a set of RAN network nodes, such as first network node 111 and second network node 112, each providing radio coverage over one or more geographical areas, such as a cell 115, 116 of a radio access technology (RAT), such as 5G, LTE, UMTS, W-Fi or similar. The radio network nodes 111, 112 may be a radio access network node such as radio network controller or an access point such as a wireless local area network (WLAN) access point or an Access Point Station (AP STA), an access controller, a base station, e.g. a radio base station such as a gNB, a NodeB, an evolved Node B (eNB, eNodeB), a base transceiver station, Access Point Base Station, base station router, a transmission arrangement of a radio base station, a stand-alone access point or any other network unit capable of serving a wireless device within the cell, which may also be referred to as a service area, served by the radio network node 110, 111 depending e.g. on the first radio access technology and terminology used.

In some embodiments a control entity 130 may operate as a CN node such as an Access and Mobility Management function (AMF) or as Operation And Maintenance (OAM) or another external function.

Figure 3A:
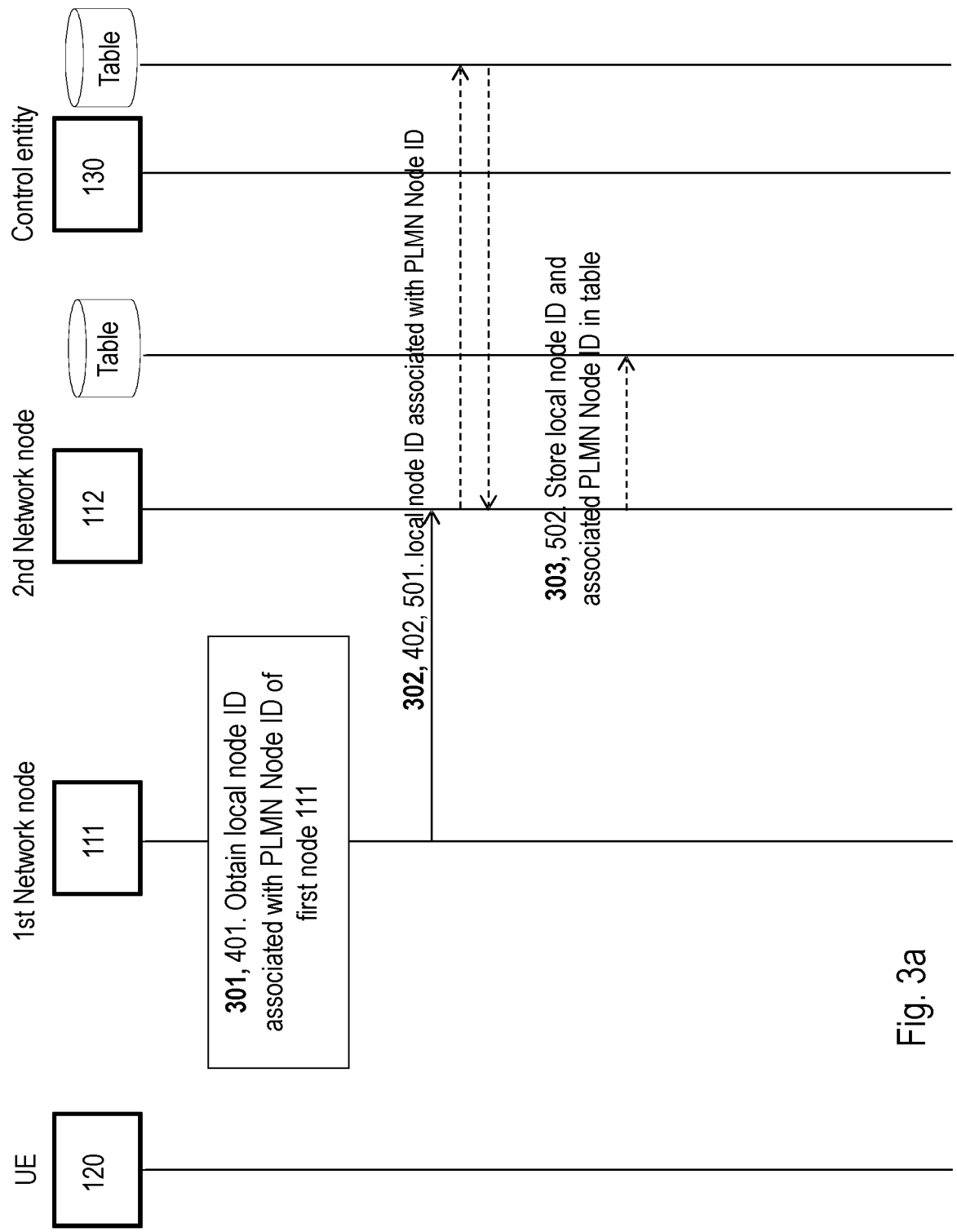
FIGS. 3 *a* and *b* are a sequence diagrams illustrating embodiments of a method.
Figure 3B:
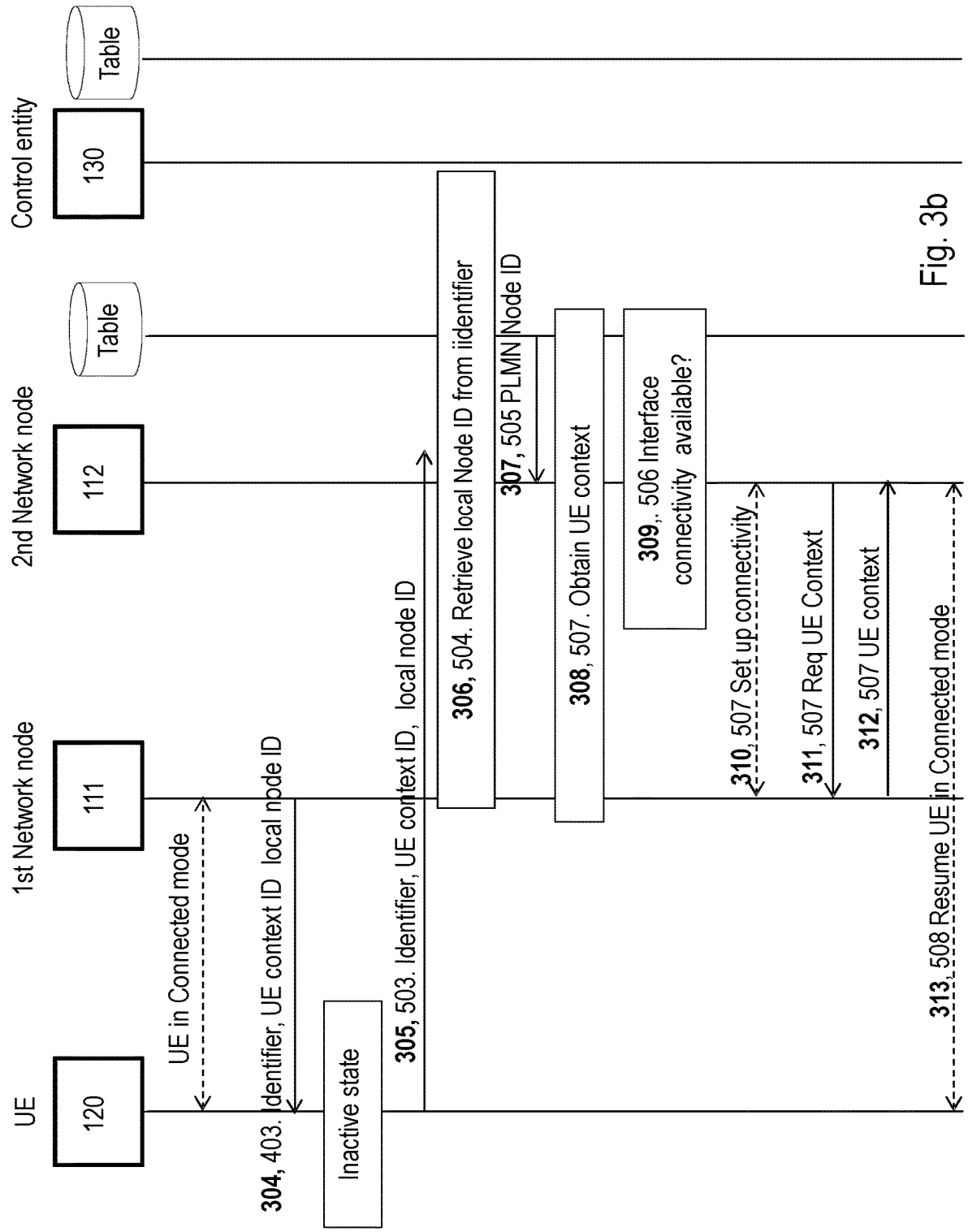

FIG. 3a and FIG. 3b very briefly depicts a method according to example embodiments herein seen in the view of the involved nodes. The method comprises the following actions whereof some of the actions are optional.

This will be followed by a more detailed and explaining description.

Actions 301-303 are shown in FIG. 3a. In this part of the method a PLMN RAN node ID, e.g. a gNB ID, of the first network node 111 is mapped, also referred to as associated, to a Local RAN Node Identifier of the first network node 111. The associated PLMN RAN node ID and Local RAN Node Identifier may be one of many entries in a table e.g. referred to as an Inactive Relation Table (IRT). The associated PLMN RAN node ID and Local RAN Node Identifier will be used later on by a target node, such as the second network node 112 to identify a UE Context to be used for resuming the inactive UE 120 into connected state.

A PLMN RAN Node ID when used herein means the gNB ID part the Global gNB ID or the ng-eNB ID part of the Global ng-eNB ID as defined in 3GPP TS 38.423.

A Local RAN Node Identifier when used herein means an identity of an NG-RAN node that is unique within a set of NG-RAN nodes that can interoperate over the XnAP, X2AP, NGAP or S1AP interface. The Local RAN Node Identifier is a sequence of X bits. If the Local RAN Node Identifier is of fixed length, it comprises a Local RAN Node ID of X bits. If the Local RAN Node Identifier is of variable length, it comprises a "Local RAN Node ID Length" of Y bits and a "Local RAN Node ID" of Z bits.

A "Local RAN Node ID Length" when used herein means Y bits to assess the amount of bits used for "Local RAN Node ID".

A "Local RAN Node ID" when used herein means Z bits.

Action 301. The first network node 111 obtains a Local RAN Node Identifier associated with a PLMN RAN Node ID. The Local RAN Node Identifier and associated PLMN RAN Node ID, identifies, such as uniquely identifies, the first network node 111. This action relates to action 401 described below.

Action 302. The first network node 111 sends the obtained Local RAN Node Identifier and associated PLMN RAN Node ID to be obtainable by the second network node 112. The Local RAN Node Identifier and associated PLMN RAN Node ID may in some embodiments be sent to the second network node 112, and in some embodiments to a control entity such as e.g. an AMF or an OAM entity, that will share the Local RAN Node Identifier and associated PLMN RAN Node ID with the second network node 112. Thus, the second network node 112 will obtain the Local RAN Node Identifier and associated PLMN RAN Node ID identifying the first network node 111 serving the UE 120 in connected state before being suspended into inactive state. This action relates to actions 402 and 501 described below.

Action 303. The second network node 112 may then store the Local RAN Node Identifier and associated PLMN RAN Node ID as an entry in a table. This action relates to action 502 described below.

Actions 304-313 are shown in FIG. 3b. In this part of the method the associated PLMN RAN node ID and Local RAN Node Identifier are used by the second network node 112 to identify a UE Context to be used to resume the connection for the inactive UE 120.

Action 304. In an example scenario, the UE 120 is in connected mode. For some reason, the first network node 111, serving the UE 120 e.g. in a communication, suspends 403 the UE 120 from connected state into inactive state, and sends an identifier to the UE 120. The identifier comprises a UE Context ID and the associated Local RAN Node Identifier, which UE Context ID identifies the UE Context associated with the UE 120.

The UE Context ID, Local RAN Node Identifier and associated PLMN RAN Node ID will assist the second network node 112 to obtain the UE Context for the resuming of the UE 120 into connected state, wherein a connection is to be provided by the second network node 112. This action relates to action 403 described below.

Action 305. In the example scenario, the suspended UE 120 being in inactive mode now needs to be in connected mode again and sends a resume request message to a network node other than the first network node 111, here the second network node 112 is a candidate for serving the UE 120. The second network node 112 thus receives the resume request message from the UE 120. The resume request message comprises an identifier comprising a UE Context ID and the associated Local RAN Node Identifier. The UE Context ID identifies a UE Context associated with the UE 120. An identifier then used herein means the Inactive RNTI, I-RNTI, e.g. the full I-RNTI or the short-IRNTI. This action relates to action 503 described below.

Action 306. The second network node 112 retrieves the Local RAN Node Identifier from the identifier. This action relates to action 504 described below.

Action 307. The Local RAN Node Identifier and associated PLMN RAN Node ID were obtained by the second network node 112 in action 302 and e.g. stored as an entry in a table in action 303 above. The second network node 112 will now use the retrieved Local RAN Node Identifier to identify the associated PLMN RAN Node ID, e.g. by reading the table. In this way the second network node 112 obtains the associated PLMN RAN Node ID based on the Local RAN Node Identifier retrieved from the identifier. This action relates to action 505 described below.

Action 308. The associated PLMN RAN Node ID will be used by the second network node 112 to identify the network node knowing the UE Context of the UE 120 being used in active state, before being suspended. Thus, based on the obtained PLMN RAN Node ID, the second network node 112 obtains the UE Context from the first network node 111. This action relates to action 506 described below.

Action 309. Based on the obtained PLMN RAN Node ID, the second network node 112 decides whether or not an interface connectivity is available to the first network node 111. The interface connectivity may e.g. be any one out of an Xn Application Protocol (XnAP) interface, or an X2 Application Protocol (X2AP) interface, or a Next Generation Application Protocol (NGAP) interface, or an S1 Application Protocol (S1AP) interface. This action relates to action 506 described below.

The obtaining 506 the UE Context from the first network node 111 may be performed by any of actions 310-312.

Action 310. When an interface connectivity is not available to the first network node 111, the second network node 112 triggers a procedure to setup an interface connectivity to the first network node 111. This action relates to action 507 described below.

Action 311. When an interface connectivity is available to the first network node 111, the second network node 112 requests e.g. via the XnAP or X2AP connectivity, a UE Context for the UE 120 that has sent the resume request message comprising the UE Context ID. This action relates to action 507 described below.

Action 312. The second network node 112 receives, via the interface connectivity when set up, a UE Context for the UE 120 that has sent the resume request message comprising the UE Context ID. This action relates to action 507 described below.

Action 313. Based on a UE Context received from the first network node 111, the second network node 112 resumes the inactive state UE 120 into connected state by providing a connection with the UE120. This action relates to action 508 described below.

Embodiments of a Method Performed in a Distributed Approach

An example method, also referred to as the first method, is performed in a distributed approach by the first network node 111, e.g. referred to as a source network node 111 of an NG-RAN. This method may comprise:

The first network node 111 has a configured PLMN RAN Node ID (e.g. by an Operation and Maintenance) and maps this to a Local RAN Node Identifier, e.g. where the Local RAN Node Identifier possibly has fewer bits than the PLMN RAN Node ID;

When suspending the UE 120, i.e. when transitioning the UE 120 to inactive state, the first network node 111 includes an identifier in a message. The message may e.g. be a Release message such as a SuspendConfiguration message. The identifier comprises the Local RAN Node Identifier, identifying the first network node 111. The identifier may be an I-RNTI, that comprises the Local RAN Node Identifier, also referred to as the identifier encodes the Local RAN Node Identifier.

The example method performed in a distributed approach by the second network node 112 may comprise:

The second network node 112 receives from the UE 120 an RRC Resume Request message including an identifier such as an I-RNTI;

The second network node 112 retrieves the Local RAN Node Identifier from the identifier such as an I-RNTI, e.g. X significant bits;

The second network node 112 obtains the PLMN RAN Node ID of the first network node 111 based on the Local RAN Node Identifier e.g. by reading a table such as an IRT;

If a connectivity is available towards the first network node 111 (e.g. directly via XnAP or X2AP or indirectly via NGAP or S1AP), whose PLMN RAN Node ID is the obtained PLMN RAN Node ID, the second network node 112 requests the UE Context for the UE 120 that has transmitted the identifier such as the I-RNTI;

Else, the second network node 112 triggers a procedure to setup e.g. an XnAP or X2AP connectivity; and then requests the UE Context for the UE 120 that has transmitted the identifier such as an I-RNTI.

In the distributed method, the responsibility to build and maintain the mapping is shared between the network nodes such as the first and second network nodes 111, 112. The Local RAN Node Identifier is assigned by the network nodes such as the first and second network nodes 111, 112 and may be of fixed or variable length.

The identifier such as the encoded I-RNTI may comprise the Local RAN Node Identifier, PLMN RAN Node ID and the UE Context ID.

The method supports both full I-RNTI and short I-RNTI.

Embodiments of a Method Performed in a Centralized Approach

Some embodiments relate to a second method executed at the first network node 111, e.g. referred to as a source network node 111 of an NG-RAN. The example method performed in a centralized approach by the first network node 111 may comprise:

The first network node 111 may associate, i.e. map, its node identifier such as a PLMN RAN Node ID, with a Local RAN Node Identifier, e.g. if there is a need to synchronize the information between the control entity and the first network node 111.

The first network node 111 may e.g. obtain from the control entity the mapping between the PLMN RAN Node ID and the Local RAN Node Identifier. The PLMN RAN Node ID may e.g. be configured by an OAM node and/or function, like a gNB Identifier. The Local RAN Node Identifier may e.g. comprise fewer bits than the PLMN RAN Node ID. Different examples of this will be described more in detail below.

When suspending the UE 120, i.e. transitioning the UE 120 to inactive state, the first network node 111 includes in a message, such as e.g. a Release message a suspend Configuration comprising an identifier such as an I-RNTI that comprises the mapped Local RAN Node Identifier, e.g. encodes the mapped Local RAN Node Identifier. Encode a Local RAN Node Identifier means to represent the Local RAN Node Identifier with a number "X" of bits of the I-RNTI, e.g. (but not limited to) the first X leftmost bits of the I-RNTI. The number X of bits used can be fixed or variable.

Embodiments herein further comprise a method executed at the second network node 112, e.g. target network node, of a NG-RAN. The example method performed in a centralized approach by the second network node 112 may comprise:

The second network node 112 receives an RRC Resume Request message including an identifier such as an I-RNTI.

The second network node 112 retrieves a Local RAN Node Identifier from the identifier such as the I-RNTI, e.g. X significant bits;

The second network node 112 obtains the PLMN RAN Node ID of the first network node 111 which is e.g. may be a gNB ID, based on the Local RAN Node Identifier. This may be performed by reading a mapping table such as an IRT;

In some embodiments, if e.g. an XnAP or X2AP connectivity is available with the first network node 111, whose identifier is the obtained PLMN RAN Node ID, the second network node 112 requests the UE Context for the UE 120 that has transmitted the identifier such as an I-RNTI; else, the second network node 112 triggers a procedure to setup e.g. the XnAP or X2AP connectivity; and then requests the UE Context for the UE 120 that has transmitted the identifier such as an I-RNTI.

In this centralized approach method the entity responsible to build and maintain the mapping between the PLMN RAN Node ID and the Local RAN Node Identifier is a control entity 130. The Local RAN Node Identifier may be of fixed or variable length. In case of variable length for the Local RAN Node Identifier, the UE 120 provides the information in an identifier such as e.g. in an I-RNTI or as part of an RRC Release message.

Each network node such as each of the first and second network nodes 111, 112 may have a local table, such as an IRT table, that allows to resolve the identity of all the neighbour RAN nodes, e.g. towards which XnAP or X2AP, or NGAP or S1AP connectivity is defined.

Upon the reception of an RRCResumeRequest or RRCResumeRequest1 including an identifier such as an I-RNTI, from a UE, such as the UE 120, the network node such as the second network node 112, where the UE 120 is trying to resume may be able to identify:

The source network node, such as the first network node 111 hosting the UE Context from where the target network node, such as the second network node 112, requires the retrieval of the UE Context; and/or That the target network node, such as the second network node 112 does not have a connection with the source network node 111 hosting the UE Context (e.g. directly via XnAP or X2AP, or indirectly via NGAP or S1AP) from where the target network node requires to request the retrieval of the UE Context.

The encoded identifier such as the I-RNTI includes at least a Local RAN Node Identifier and the UE Context ID.

The method supports both full I-RNTI and short I-RNTI.

Figure 4:
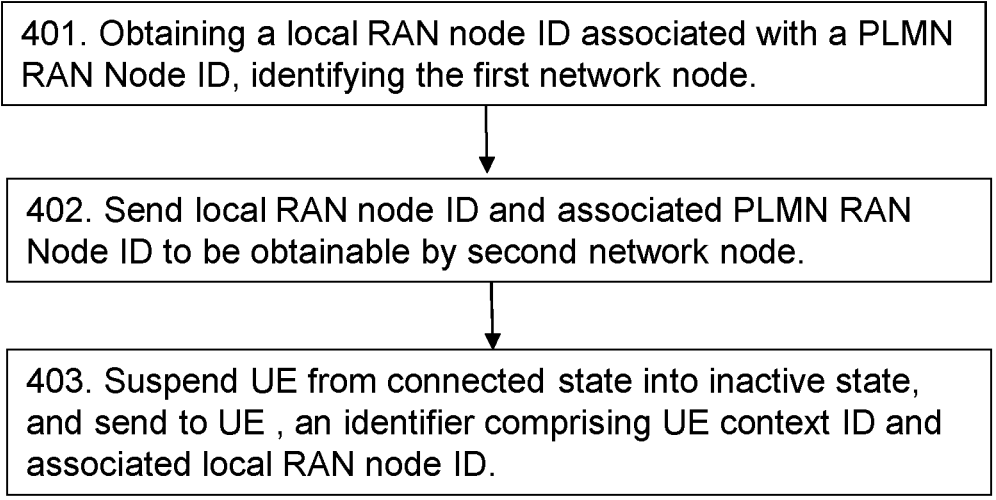
FIG. 4 is a flowchart depicting embodiments of a method performed by a first network node.

FIG. 4 depicts embodiments of a method, comprising both the centralized and distributed approach, according to example embodiments herein seen in the view of the first network node 111. The method is only briefly described here and will be exemplified and explained more in detail after describing FIG. 4 and FIG. 5. FIG. 4 illustrates method actions performed by the first network node 111 for assisting the second network node 112 in resuming of the UE 120 in inactive state into connected state in the RAN 100.

The method may comprise one or more of the following actions which actions may be taken in any suitable order.

Action 401

According to embodiments herein the first network node 111 obtains a Local RAN Node Identifier associated with a PLMN RAN Node ID. The Local RAN Node Identifier associated with a PLMN RAN Node ID identifies the first network node 111.

The identifier may be represented by an Inactive Radio Network Temporary Identifier, (I-RNTI).

Action 402

The first network node 111 sends the Local RAN Node Identifier and associated PLMN RAN Node ID to be obtainable by the second network node 112. The Local RAN Node ID and associated PLMN RAN Node ID may be sent to neighbour nodes such as the second RAN node. Thus, in some embodiments the first network node 111 shares the Local RAN Node ID and associated PLMN RAN Node ID with neighbour network nodes. The neighbour network nodes may comprise the second network node 112.

In some embodiments the first network node 111 the second network node 112 is a neighbour node to the first network node 111. The wording being a neighbour node to a network node may mean that a signalling path can be setup between the nodes, e.g. XnAP, X2AP, NGAP, S1AP.

Thus the Local RAN Node ID and associated PLMN RAN Node ID may be sent to any one out of: The second network node 112, e.g. in the distributed approach, or the second network node 112 via a control entity 130 e.g. in the centralized approach, sharing the Local RAN Node Identifier and associated PLMN RAN Node ID with the second network node 112.

Action 403

The first network node 111 suspends the UE 120 from connected state into inactive state. The first network node 111 sends an identifier to the UE 120. The identifier comprises a UE Context ID and the associated Local RAN Node Identifier. The UE Context ID identifies the UE Context associated with the UE 120 and it is the first network node 111 that hosts the UE Context for the suspended session.

The UE Context ID, Local RAN Node Identifier and associated PLMN RAN Node ID will assist the second network node 112 to obtain the UE Context for the resuming of the UE 120 into connected state, wherein a connection is to be provided by the second network node 112. How this is performed in the second network node 112 will be described below.

Figure 5:
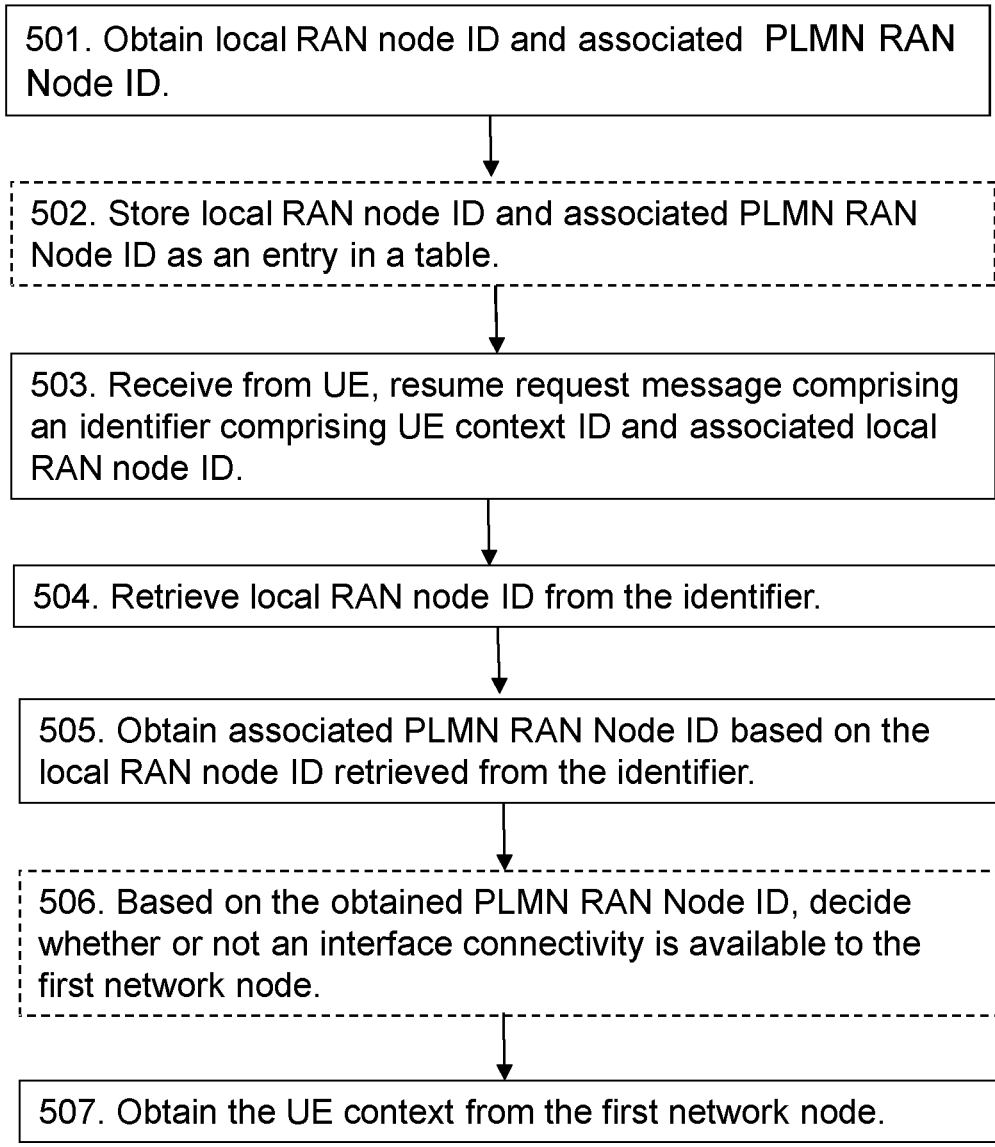
FIG. 5 is a flowchart depicting embodiments of a method performed by a second network node.

FIG. 5 depicts methods according to example embodiments herein seen in the view of the second network node 112. The method is only briefly described here and will be exemplified and explained more in detail after describing FIG. 5. FIG. 5 illustrates the method performed by the second network node 112 for enabling a resume of the UE 120 in inactive state into connected state in the RAN 100. The method may comprise one or more of the following actions which actions may be taken in any suitable order.

Action 501

The second network node 112 obtains a Local RAN Node Identifier and associated PLMN RAN Node ID. The Local RAN Node Identifier and associated PLMN RAN Node ID identifies the first network node 111 serving the UE 120 in connected state before being suspended into inactive state.

The Local RAN Node Identifier and associated PLMN RAN Node ID may be obtained from any one out of: the first network node 111 or from the first network node 111 via a control entity, sharing the Local RAN Node Identifier and associated PLMN RAN Node ID with the second network node 112. The second network node 112 may be a neighbour node to the first network node 111.

Action 502

In some embodiments, the second network node 112 stores the Local RAN Node ID and associated PLMN RAN Node ID as an entry in a table.

Action 503

It is the first network node 111 that hosts the UE Context for the suspended session. The second RAN node 112 will used the obtained Local RAN Node Identifier and associated PLMN RAN Node ID to identify the first network node 111 that hosts the UE Context. This is to be able to request the UE Context from the network node that hosts the UE Context.

Thus, the second network node 112 receives a resume request message from the UE 120. The resume request message comprises an identifier comprising a UE Context ID and the associated Local RAN Node ID. The UE Context ID identifies a UE Context associated with the UE 120. The Local RAN Node ID identifies the RAN node hosting the UE Context.

Action 504

The second network node 112 then retrieves the Local RAN Node ID from the identifier.

Action 505

The second network node 112 obtains the associated PLMN RAN Node ID based on the Local RAN Node ID retrieved from the identifier. This may be performed by reading the table.

Action 506

Based on the obtained PLMN RAN Node ID, the second network node 112 may in some embodiments decide whether or not an interface connectivity is available to the first network node 111, according to any one out of: an Xn Application Protocol (XnAP) interface, or an X2 Application Protocol (X2AP) interface, or an NG Application Protocol (NGAP) interface, or an S1 Application Protocol (S1AP) interface.

Action 507

Based on the obtained PLMN RAN Node ID and the UE Context ID, the second network node 112 obtains the UE Context from the first network node 111

In the embodiments wherein the second network node 112 has decided whether or not an interface connectivity is available to the first network node 111, the obtaining of the UE Context from the first network node 111 may be performed by:
- when an interface connectivity is available to the first network node 111, the second network node 112 may request e.g. via the XnAP connectivity, a UE Context for the UE 120 that has sent the resume request message comprising the UE Context ID, and
- when an interface connectivity is not available to the first network node 111, the second network node 112 may trigger a procedure to setup an interface connectivity to the first network node 111 and requesting via the interface connectivity when set up, a UE Context for the UE 120 that has sent the resume request message comprising the UE context ID.

Action 508

Based on a UE Context received from the first network node 111, the second network node 112 may resume the UE 120 from the inactive state into connected state by providing a connection with the UE120.

The embodiments described above will now be further explained and exemplified. It should be noted that the embodiments described below may be combined with any suitable embodiment described above.

Embodiments herein comprise two alternatives methods for the second network node 112 to identify the PLMN RAN Node ID of the first network node 111 for UEs such as the UE 120 in RRC_INACTIVE state, based on the identifier such as the I-RNTI. This is, for the second network node 112 to be able to obtain the UE Context from the first network node 111. The common aspect between the two methods is the association of the Local RAN Node Identifier with the PLMN RAN Node ID, e.g. by means of a mapping table, as will be described below.

Disclaimer: The wording second network node 112 or target NG-RAN node is used herein to refer to the node where the UE 120 may try to resume i.e. where the UE 120 sends an RRC Resume Request message including an identifier such as an I-RNTI. The wording second network node 112 or source NG-RAN node is used to refer to the node where the UE AS Context is stored i.e. where the second network node 112 such as the target NG-RAN node should request the UE Context.

Inactive Relation Table (IRT)

The common aspect between the two alternatives is the definition of a mapping table also referred to as an associating table, which will be referred to as an Inactive Relation Table (IRT) in the remainder of the document. The wording mapping when used herein means realizing an association between the PLMN RAN Node ID and the Local RAN Node Identifier, such that one PLMN RAN Node ID corresponds to one or more Local RAN Node Identifiers and one Local RAN Node Identifier corresponds to one PLMN RAN Node ID. The PLMN RAN Node ID is used to identify the network nodes such as gNBs where e.g. the gNB ID is defined in 3GPP TS 38.423 as a bit string of variable size, (22 . . . 32) bits long, equal to the leftmost bits of the NR Cell Identity IE contained in the NR CGI IE of each cell served by the source network node such as the first network node 111. The Local RAN Node Identifier is a shorter version (bitwise) of the PLMN RAN Node ID that fits into the identifier such as the I-RNTI. The method to derive Local RAN Node Identifier depends on the alternative and it is described in more details below.

The identifier, such as the full I-RNTI or short-IRNTI, is encoded in a way such that the Local RAN Node Identifier is included to represent the PLMN RAN Node ID of the source network node such as the first network node 111. At RRC Resume, the second network node 112 receiving the resume request message such as the RRC Resume Request/Request1, is able to resolve the PLMN RAN Node ID identifying the first network node 111 hosting the UE Context such as e.g. the UE AS Inactive context, by decoding the Local RAN Node Identifier in the identifier, such as the full I-RNTI or short-IRNTI and read the IRT table.

The IRT table may be implemented as a Neighbour Relation Table, e.g. built using an Automatic Neighbour Relation (ANR) method.

When there is a change in the Local RAN Node Identifier, the IRT table may then keep temporarily both old and new Local RAN Node Identifier values to address the same network node, such as the first network node 111.

The Distributed Method

In the distributed method, the source network node such as the first network node 111 has a configured PLMN RAN Node ID, e.g. by an OAM node that is associated, i.e. mapped, to a Local RAN Node Identifier. That Local RAN Node Identifier is comprised in the identifier together with the UE Context ID, such as e.g. to encode an I-RNTI, to be sent, e.g. in an Suspend Configuration included in the Release message, for a given UE such as the UE 120 that is being suspended by the source network node such as the first network node 111. In other words, the source network node such as the first network node 111 may build the identifier such as the I-RNTI for a given UE such as the UE 120 being suspended including the Local RAN Node Identifier in the identifier, such as the I-RNTI, bits.

In the distributed method, the target network node such as the second network node 112 receives an identifier comprising the UE Context ID and associated Local RAN Node Identifier from the UE 120 in a resume request message, e.g. in the I-RNTI transmitted e.g. in an RRC Resume Request. The Local RAN Node Identifier is used to resolve the PLMN RAN Node ID.

Each target network node such as the second network node 112 may have a respective IRT table. The table IRT is used to map the decoded Local RAN Node Identifier in received identifiers such as I-RNTIs in resume request messages to the PLMN RAN Node ID of neighbour network nodes.

One entry of the IRT table may comprise at least the following:
- PLMN RAN Node ID: e.g. a bit string of variable size, e.g. 22-32 bits long, equal to the leftmost bits of an NR Cell Identity IE comprised in an NR Cell Global Identifier (CGI) IE of each cell served by the target network node such as the second network node 112.
- Local RAN Node Identifier: at initiation the Local RAN Node Identifier may be a random number, the length of which is common for all network nodes. Hence, a source network node such as the first network node 111 in this example generates its own Local RAN Node Identifier using this random function and builds up its own record in the IRT.
- Identifier type such as I-RNTI type: (optional) a Boolean indicating which type of I-RNTI (full or short) the target network node such as the second network node 112 expects to receive at RRC Resume. For example, 0 means short I-RNTI is expected, 1 means full I-RNTI is expected. This is needed if the IRT is an advantage in a network where both the full and short I-RNTI are used.
- PLMN: (optional) Storing the PLMN enables the Local RAN Node Identifier to be selected within the PLMN independent of Local RAN Node Identifiers for other PLMNs which makes the Local RAN Node Identifier allocation independent between operators in a network sharing scenario.

How to Build and Maintain IRT Tables

Each network node such as the first and second network node 111, 112 may be configured, e.g. by an OAM node, with the length of the random number to use.

One source network node such as the first network node 111 draws the Local RAN Node Identifier as a random number. An entry is created in the IRT table to associate the PLMN RAN Node ID of the source network node such as the first network node 111 to the Local RAN Node Identifier.

If connectivity (e.g. XnAP or X2AP) exists with other network nodes such as neighbour network nodes, the source network node such as the first network node 111 exchanges its Local RAN Node Identifier towards all its neighbour network nodes such as the second network node 112, e.g. for XnAP via Xn Setup or NG-RAN Node Configuration Update. That may be initiated by the source network node such as the first network node 111, or as a response to a request from another node e.g. that is possibly trying to setup XnAP connectivity. An alternative variant is that if e.g. XnAP connectivity does NOT exist with other network nodes e.g. neighbour network nodes, the source network node such as the first network node 111 provides its Local RAN Node Identifier to a Core Network node e.g. AMF node, that may provide that information to its associated network nodes such as the first and second network nodes 111, 112. If a UE such as the UE 120, comes to a neighbour network node that does not have e.g. XnAP connectivity with the source network node such as the first network node 111, that neighbour network node may possibly try to setup XnAP connectivity. In another embodiment a network node such as any of the first and second network nodes 111, 112, may be either configured with a different parts of the Local RAN Node Identifier, either a different Local RAN Node ID Length or a different Local RAN Node ID, or this information may be reconfigured by the network node such as any of the first and second network nodes 111, 112, itself. In this case the network node would issue a configuration update message towards neighbour network nodes to inform them of an updated Local RAN Node Identifier value.

If any neighbour network nodes such as e.g. the first and second network nodes 111, 112 detect a conflict, e.g. the same Local RAN Node Identifier is assigned, a conflict resolution procedure is performed. In one example of how that procedure may be performed, the source network node such as the first network node 111, may be advertised in the return message for the ongoing setup and/or configuration update procedure. The source network node such as the first network node 111, selects a new number, e.g. draws a new random number, and re-initiates the exchange of the new Local RAN Node Identifier towards all the network nodes such as e.g. the first and second network nodes 111, 112 it has a connection to, e.g. XnAP, via Xn Configuration update.

Other variants to resolve conflicts are that any of the network nodes with conflict selects a new number while the conflict remains. To achieve a robust solution both network nodes such as e.g. the first and second network nodes 111, 112, may have a timer monitoring the time the conflict persists and when the timer expires a new value is selected and sent over the interface.

A third option is that a network node such as e.g. the first and/or second network nodes 111, 112, which selects a new value sends an indication to its neighbour network nodes informing them of the Local RAN Node Identifier it plans to select. If this value is not in conflict in the receiving network node, it indicates that the value would not cause a conflict. If all network nodes, or sufficiently many, indicate no conflict the new value is taken into use.

In another variant of this method a network node such as e.g. the first and second network nodes 111, 112, selects its own Local RAN Node Identifier and then signals it to an external system, for example the OAM. Upon detection of a Local RAN Node Identifier conflict, the network node detecting the conflict reports it to the external system. The external system assigns a new Local RAN Node Identifier to one of the nodes in conflict, hence removing the Local RAN Node Identifier conflict condition.

Each network node such as e.g. the first and second network nodes 111, 112, may keep more than one Local RAN Node Identifier. This allows to cope with transient periods during which the network node may serve a UE such as the UE 120, whose identifiers e.g. I-RNTIs includes a Local RAN Node Identifier for which a conflict has been detected before a Resume for the same UE is triggered. The same UE may later be configured again as RRC Inactive and in such case it will be assigned an identifier, e.g. I-RNTI, comprising the newest Local RAN Node Identifier drawn by the source network node such as the first network node 111. The oldest Local RAN Node Identifier in the list of Local RAN Node Identifiers maintained by a network node such as e.g. the first and second network nodes 111, 112, may be discarded when there are no more RRC Inactive UEs to serve that were assigned the oldest Local RAN Node Identifier.

In case of no conflict detected at a target network node such as the second network node 112, e.g. different Local RAN Node Identifier between the source network node such as the first network node 111 and neighbour network node such as the second network node 112, the neighbour network node returns its Local RAN Node Identifier towards the source network node such as the first network node 111. In this case, a new entry is created in the neighbour network node IRT table to map the received Local RAN Node Identifier to the corresponding PLMN RAN Node ID. A new entry is also created in the source network node such as the first network node 111 IRT table to map the returned Local RAN Node Identifier to the neighbour PLMN RAN Node ID. As an alternative implementation the neighbour network node always returns its Local RAN Node Identifier(s) i.e. also if there is a conflict.

I-RNTI Encoding

The I-RNTI may be encoded as follows:
1. Node information
   a. Random number with fixed size
2. UE Context ID The Centralized Method IRT Table In the centralized method, the information required to resolve the PLMN RAN Node ID, Local RAN Node Identifier is provided by a control entity and advertised to network nodes such as any of the first and second network nodes 111, 112.

The control entity creates and maintains a reference, e.g. a master, IRT table, while the network nodes such as e.g. the first and second network nodes 111, 112, have a local copy of the IRT table. The master IRT table and the local IRT tables are kept in synchronisation.

Each network node such as e.g. the first and second network nodes 111, 112, uses the entry of the local IRT table corresponding to its own PLMN RAN Node ID to include in the identifier, e.g. encode I-RNTI, to be sent e.g. to the UE such as the UE 120, e.g. in a message, such as e.g. a Release message a Suspend Configuration. The network node uses the local IRT table to associate, i.e. map, the decoded Local RAN Node Identifier in the received identifier e.g. the I-RNTI, in the resume request message, e.g. the RRCResumeRequest/Request/message to the appropriate neighbour network nodes such as e.g. the first and second network nodes 111, 112.

RNA Network Set

In the control entity, one or more sets of network nodes, e.g. comprising the first and second network nodes 111, 112, are created, referred to as RAN Notification Area, RNA, Network Set (RNA NW Set). Each RNA NW Set is assigned an identifier, RNA NW Set ID, unique within the control entity. In larger networks where more control entities may be used, the same RNA NW Set ID may be reused by different control entities. In such case, the geographical areas under the responsibility of control entities reusing the same RNA NW Set ID may not have common boundaries.

The control entity puts an individual network node such as e.g. the first and/or second network node 111, 112, into an RNA Network Set and assigns to the respective network node a Local RAN Node Identifier.

In the control entity, the number of network nodes that may be assigned to a specific RNA NW Set (RNA NW Set size), may be fixed for all RNA NW Sets or configurable per RNA NW Set. In case of configurable RNA NW Set size, this information is preferably advertised from the control entity to the network nodes such as e.g. the first and second network nodes 111, 112.

One Local RAN Node Identifier is unique within the RNA NW Set. One network node such as e.g. any one of the first and second network node 111, 112, may belong to one and only one RNA NW Set.

The control entity creates the reference IRT table, or "master" IRT table, with the mapping between the PLMN RAN Node ID, RNA NW ID and Local RAN Node Identifier and distributes it to the network nodes such as e.g. the first and second network nodes 111, 112 of the same RNA NW Set. Each network node such as any of the first and second network nodes 111, 112, creates a local copy of the master IRT table, or "local" IRT table. The master IRT table and the local IRT tables are synchronized if needed.

Note that connectivity (e.g. XnAP or X2AP) may exist between network nodes belonging to different RNA NW Sets, but in such case the uniqueness of the Local RAN Node Identifiers is not guaranteed. This is not a problem though since the identifier, e.g. the I-RNTI, also comprises the RNA NW Set ID which differentiates between those cases. The RNA NW Set ID and the Local RAN Node Identifier are used to contact the last serving network node such as the first network node 111, at RRC Resume and in case there is a need to contact a network node across an RNA NW Set border, the RRC Resume may be subject to fallback to RRC Establishment.

Figure 6:
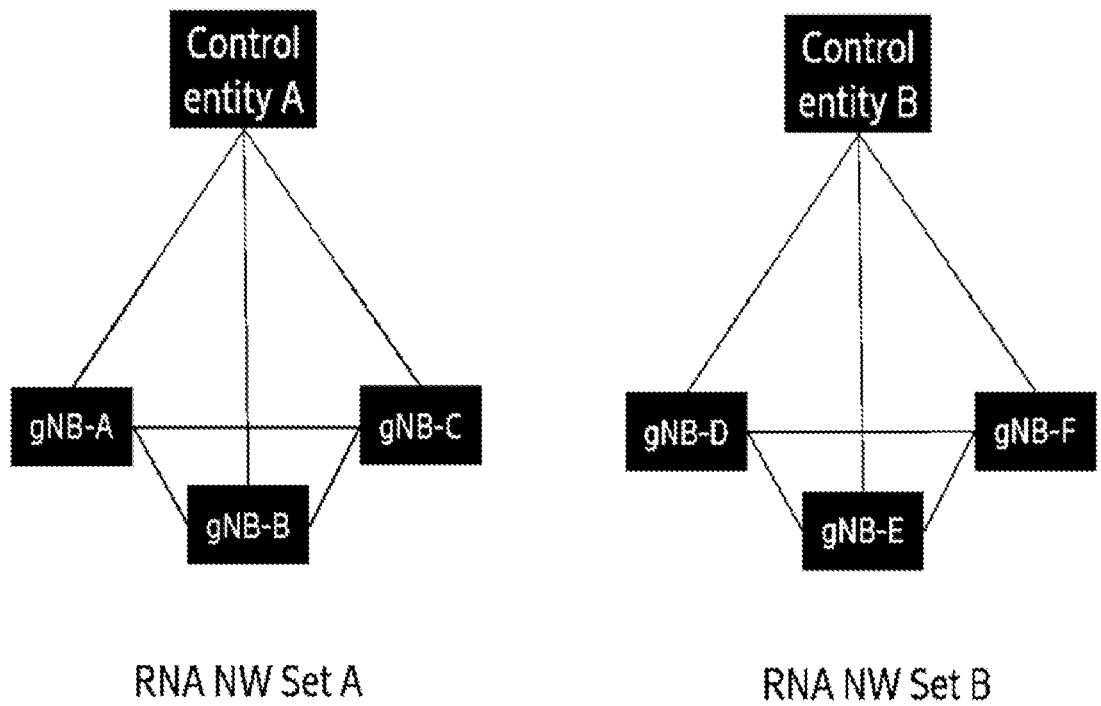
FIG. 6 is a schematic block diagram illustrating embodiments of a network.

FIG. 6 depicts an example of network deployment where more than one control entity is used, e.g. two control entities where one control entity controls one RNA NW Set. A first control entity e.g. named "Control Entity A" controls a first RNA NW Set, named e.g. "RNA NW Set A", comprising a first set of network nodes, named e.g. gNB-A, gNB-B, gNB-C. A second control entity e.g. named "Control Entity B" controls a second RNA NW Set, named e.g. "RNA NW Set B", comprising a second set of network nodes, named e.g. gNB-D, gNB-E and gNB-F. Within each RNA NW Set, the connectivity (e.g. XnAP, X2AP, NGAP, S1AP) is defined among the network nodes and between the network nodes and the control entity.

Figure 7:
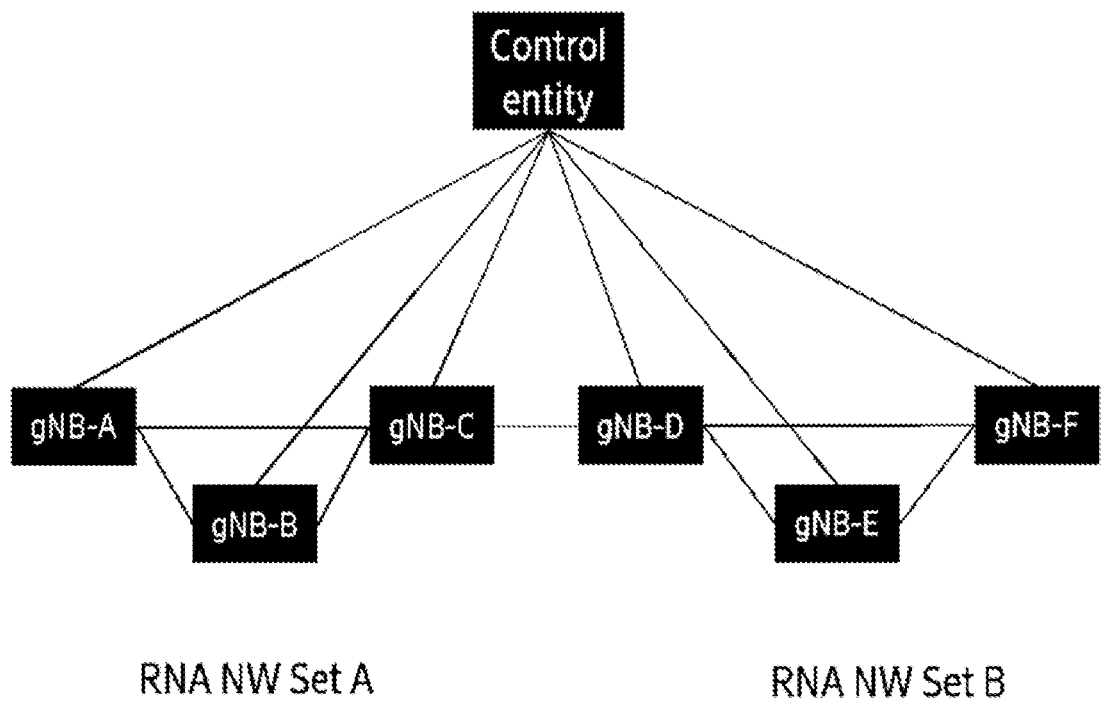
FIG. 7 is a schematic block diagram illustrating embodiments of a network.

FIG. 7 depicts an example of network deployment comprising where one control entity can control more RNA NW Sets, e.g. one control entity that controls two RNA NW Sets. The first RNA NW Set is named e.g. "RNA NW Set A", comprising a first set of network nodes, named e.g. gNB-A, gNB-B, gNB-C. The second RNA NW Set is named e.g. "RNA NW Set B", comprising a second set of network nodes, named e.g. gNB-D, gNB-E and gNB-F. Within each RNA NW Set, the connectivity (e.g. XnAP, X2AP, NGAP, S1AP) is defined among the network nodes and between the network nodes and the control entity. Furthermore, the connectivity (e.g. XnAP, X2AP) may be defined e.g. between the network nodes belonging to different RNA NW Sets, as e.g. between gNB-C and gNB-D.

IRT Table Structure

One entry of the reference IRT table may comprise e.g. at least the following:

PLMN RAN Node ID: A bit string of variable size, e.g. 22-32 bits long, equal to the leftmost bits of the NR Cell Identity IE comprised in the NR CGI IE of each cell served by the source network node such as the first network node 111.

Local RAN Node Identifier:
An index representing a network node, such as the first network node 111, in a set identified by a specific RNA NW Set and it is sent as part of the identifier, e.g. the I-RNTI. If the number of bits used to represent the Local RAN Node ID is common for all network nodes then the Local RAN Node Identifier comprises only a Local RAN Node ID. If the number of bits used to represent the Local RAN Node ID is not common for all network nodes then the Local RAN Node Identifier comprises a Local RAN Node ID Length and a Local RAN Node ID.

Local RAN Node ID Length, e.g. if not common for all network nodes: The number of bits used to represent the Local RAN Node ID within an RNA NW Set. Used at the NG-RAN node receiving an RRC Resume to distinguish the number of bits of the identifier, e.g. the I-RNTI used to encode the Local RAN Node ID and the number of bits of the identifier, e.g. the I-RNTI used to encode the UE Context ID.

Local RAN Node ID, e.g. the number of bits used to represent the network node.

RNA NW Set ID: An index that identifies a set of network nodes comprising one or more of the first and second network nodes 111, 112. Different RNA NW Sets of network nodes may comprise a variable number of network nodes in the same RNA NW Set and it is left to implementation to decide how the control entity maps a network node along with its Local RAN Node Identifier to a specific RNA NW Set. One RNA NW Set may be updated when a new Xn link is established or removed, but not because of temporary Xn link unavailability.

Identifier type such as e.g. I-RNTI type: (optional) A Boolean indicating which type of I-RNTI, full or short, the network nodes such as anyone out of the first and second network nodes 111, 112, expects to receive at RRC Resume of the UE 120. For example: 0 means short I-RNTI is expected, 1 means full I-RNTI is expected.

PLMN (optional).

An entry of the local IRT table may preferably comprises at least the following:

PLMN RAN Node ID

Local RAN Node Identifier

An index representing a network node, in a set identified by a specific RNA NW Set and it is sent as part of the identifier, e.g. the I-RNTI. If the number of bits used to represent the Local RAN Node ID is common for all network nodes then the Local RAN Node Identifier comprises only a Local RAN Node ID. If the number of bits used to represent the Local RAN Node ID is not common for all network nodes then the Local RAN Node Identifier comprises a Local RAN Node ID Length and a Local RAN Node ID.

Local RAN Node ID Length, e.g. if not common for all network nodes: The number of bits used to represent the Local RAN Node ID within an RNA SW Set. Used at the target network node such as the second network node 112, receiving a resume request such as e.g. an RRC Resume, to distinguish the number of bits of the identifier, e.g. I-RNTI used to encode the Local RAN Node ID and the number of bits of the identifier, e.g. I-RNTI used to encode the UE Context ID.

Local RAN Node ID, e.g. the number of bits used to represent the network node.

RNA NW Set ID

Identifier type such as e.g. I-RNTI type: A Boolean indicating which type of identifier such as I-RNTI, full or short, the NG-RAN node expects to receive at RRC Resume of the UE 120. For example: 0 means short I-RNTI is expected, 1 means full I-RNTI is expected.

As an example, assume for simplicity that the maximum number of network nodes, e.g. NG-RAN nodes, per RNA NW Set is fixed to 64 and that the number of bits to represent the RNA NW Set ID is fixed to 4. The I-RNTI is encoded as: "RNA NW Set ID", "Local RAN Node Identifier", "UE Context ID".

If the short I-RNTI is used, this gives:
3 bits for RNA NW Set ID, i.e. a maximum of 8×64=512 NG-RAN nodes.
6 bits to represents the Local RAN Node Identifier, i.e. a maximum of 64 gNB per RNA NW Set.
15 bits for UE Context ID, i.e. 2^15 UEs in total, or 32768 UEs per NG-RAN node If the full I-RNTI is used, this gives:
3 bits for RNA NW Set ID, i.e. a maximum of 8×64=512 NG-RAN nodes.
6 bits to represents the Local RAN Node Identifier, i.e. a maximum of 64 gNB per RNA NW Set.
31 bits for UE Context ID, i.e. 2^37 UEs in total, or ⊐2.15×10^9 UEs per NG-RAN node.

How to Build and Maintain IRT Tables

The centralized method is performed at a control entity, may be located e.g. in an AMF node or an OAM node and at a network node such as e.g. the first and second network nodes 111, 112, to enable the configuration of Inactive UEs, e.g. the UE 120, by that network node, the method comprising:

The control entity assigns a Local RAN Node Identifier to at least one network node such as the first network node 111 connected to it;

The control entity may assign an Local RAN Node Identifier to at least one network node such as e.g. the first network node 111 and another network node;

The control entity may assign different Local RAN Node Identifiers to multiple network nodes network nodes such as e.g. the first and second network nodes 111, 112 where each Local RAN Node Identifiers comprises the same number of bits. For example:
Control entity assigns 001 to Node-A;
Control entity assigns 010 to Node-B;
Control entity assigns 011 to Node-C;

The assignment of the Local RAN Node Identifier done by the control entity may be a subset of a unique node identifier e.g. X least significant bits out of X_max of the PLMN RAN Node ID, which may be a gNB ID. The X_max value may be a bit string from 22 to 32 bits, where X may be a subset of that.

The assignment of the Local RAN Node Identifier done by the control entity may be a subset of a PLMN RAN Node ID e.g. X most significant bits out of X_max of the PLMN RAN Node ID, which may be a gNB ID. The X_max value may be a bit string from 22 to 32 bits, where X may be a subset of that.

In some embodiments, the control entity is a core network node, such as an AMF node.

In some other embodiments the control entity is an node.

In some other embodiments the control entity is an external node,

For example, if that control entity has about 200 network nodes connected to it, it would only need to assign 16 bits to each network node such as e.g. any of the first and second network nodes 111, 112, so they are locally unique within that control entity connection.

The control entity may assign different Local RAN Node Identifiers to multiple network nodes such as e.g. the first and second network nodes 111, 112, where each Local RAN Node Identifier possibly comprising different number of bits.

In some other embodiments, the control entity provides two Local RAN Node Identifiers, one long and one short, to be used by the network node such as e.g. any of the first and second network nodes 111, 112, when building the long and the short context identifiers.

The source network node such as the first network node 111, using an assigned Local RAN Node Identifier to construct UE Context IDs, e.g. the identifier such as the the I-RNTI to be used when suspending a Connected UE 120 to Inactive state.

In some embodiments the UE Context IDs, e.g. the identifier such as the the I-RNTI is constructed based on a pre-defined pattern e.g. most significant bits of the identifier such as the I-RNTI are the assigned bit, while remaining bits are to be allocated for the different UEs to be suspended by that node; or, least significant bits of the identifier such as the I-RNTI are the assigned bit, while remaining bits are to be allocated for the different UEs to be suspended by that network node.

For example, if the source network node such as the first network node 111 is Node-B for which 010 has been assigned, the Node-B uses 010 as the 3 least significant bits in the identifier such as the I-RNTI configured to the UE 120.

For example, if the source network node such as the first network node 111 is Node-B for which 010 has been assigned, the Node-B uses 010 as the 3 most significant bits in the identifier such as the I-RNTI configured to the UE.

In some other embodiments the UE Context IDs, e.g. the identifier such as the I-RNTI is constructed based on pattern that is also provided with the assigned identifier e.g. the control entity may indicate which pattern is to be used by the network node such as e.g. any of the first and second network nodes 111, 112, e.g. most significant bits of the identifier such as the I-RNTI are the assigned bit, while remaining bits are to be allocated for the different UEs to be suspended by that node; or, least significant bits of the identifier such as the I-RNTI, are the assigned bit, while remaining bits are to be allocated for the different UEs to be suspended by that node.

For example, if the source network node such as the first network node 111 is Node-B for which 010 has been assigned, the Node-B uses 010 accordingly to a scrambled scheme known by the control entity and neighbour nodes connected to the same control entity in an I-RNTI configured to the UE.

The network node such as the first network node 111 informs its neighbour nodes for which it has e.g. an XnAP connection, such as the second network node 112, about its Local RAN Node Identifier assigned by the control entity. That may be done, in one solution, during an Xn setup. In some other embodiments is the control entity providing to each network node such as e.g. any of the first and second network nodes 111, 112, in addition to its own Local RAN Node Identifier as described earlier, the Local RAN Node Identifiers of its neighbour nodes with a value of a global identifier associated.

The target network node such as the second network node 112 using the assigned Local RAN Node Identifier to derive how many bits and which bits in a received identifier such as the I-RNTI are used as node identifier, so that it can perform context fetching.

Hence, if a source network node such as the first network node 111 was assigned with 010 by the control entity as its Local RAN Node Identifier, and assumes a given pattern (e.g. X last significant bits in I-RNTI to be used), if the target network node such as the second network node 112 receives a resume request from a UE 120 including the identifier such as the I-RNTI, it knows that the Local RAN Node Identifier is the last significant 3 bits in the identifier such as the I-RNTI. Then, upon that identification, it may know the Local RAN Node Identifier of the source network node such as the first network node 111, hosting the UE AS Context of the UE 120 trying to resume. Hence, it may check its local IRT comprising the mapping between these 3 bits and the global node identification such as the PLMN RAN Node ID to trigger UE Context fetching.

In some other embodiments, the pattern has also been provided to the network node such as e.g. any of the first and second network nodes 111, 112, i.e. whether the most significant X bits are used, least significant bits or any other scrambling pattern in incoming identifiers such as I-RNTIs. This requires advertising the PLMN RAN Node ID Length, that is the size in bits of the PLMN RAN Node ID in use e.g. in the SuspendConfig message.

The control entity providing an update of a Local RAN Node Identifier to a network node such as e.g. any of the first and second network nodes 111, 112, to be used to construct a UE Context identifier for the UE 120 being Inactive, possibly based on coverage and capacity conditions. That may comprise:

Removing a number of bits in the previously allocated Local RAN Node Identifier.

Adding a number of bits in the previously allocated Local RAN Node Identifier.

Replacing a previously allocated Local RAN Node Identifier by a new one.

The control entity providing an update of a Local RAN Node Identifier pattern, X most significant, X least significant, other scrambling pattern, etc. to a network node such as e.g. any of the first and second network nodes 111, 112, to be used to construct a UE Context ID for the Inactive UE 120, possibly based on coverage and capacity conditions.

In a variant embodiment of this method elements of both the distributed and the centralized methods may be used. Namely, an external centralized system may assign to a network node such as e.g. any of the first and second network nodes 111, 112, an initial IRT table including Local RAN Node Identifiers of neighbouring nodes. However, this table may not be complete, i.e. it may not include all neighbour nodes, or it may include Local RAN Node Identifiers in conflict. When a network node such as e.g. any of the first and second network nodes 111, 112, establishes peer to peer interfaces, e.g. XnAP interfaces, with new neighbour nodes, the network node may update the IRT table locally by including information relative to the newly discovered neighbour node. At the same time the network node may signal to a central system about the update to the IRT performed. Likewise, if a Local RAN Node Identifier conflict is detected by one or more network nodes such as e.g. the first and second network nodes 111, 112, one of the network nodes in conflict may select a new non-conflicting Local RAN Node Identifier and signal it to the central system. Likewise, the central system may reconfigure Local RAN Node Identifiers at each network node and/or update the IRT table at each network node. In this way the network nodes such as e.g. the first and second network nodes 111, 112, and the central system will always be in synchronization with respect to the IRT each network node holds and may both operate on managing and maintaining such IRTs.

Identifier e.g. I-RNTI Encoding

The identifier such as the I-RNTI may be encoded differently depending if the sizes of the Local RAN Node Identifier and UE Context ID fields are fixed or flexible. In the latter case, either the length of the Local RAN Node ID in the Local RAN Node Identifier or the length of UE Context ID may need to be included in both the RRC Release and RRC Connection Resume procedures. The number of bits used to encode and decode the Local RAN Node ID is indicated by the Local RAN Node ID Length. The remaining bits of the identifier such as the I-RNTI are used to encode and decode the UE Context ID.

In some embodiments, with fixed size for RNA NW Set, the identifier such as the I-RNTI may be encoded as follows:
1. Node information
   a. RNA NW Set ID
   b. Local RAN Node Identifier, comprising Local RAN Node ID Length and Local RAN Node ID
2. UE Context ID In another embodiment, with variable size for RNA NW Set, the identifier such as the I-RNTI may be encoded as follows:
1. Node information
   a. RNA NW Set ID
   b. Local RAN Node Identifier, comprising Local RAN Node ID Length and Local RAN Node ID as a Random Number
2. UE Context ID In another embodiment, with variable size for RNA NW Set, the identifier such as the I-RNTI may be encoded as follows:
1. Node information
   a. RNA NW Set ID
   b. b. Local RAN Node Identifier, comprising Local RAN Node ID Length and Local RAN Node ID as a not Random number
2. UE Context ID To perform the method actions above the first network node 111 is configured to assist the second network node 112 in resuming of the UE 120 in inactive state into connected state in a RAN 100 and may comprise the arrangement depicted in FIGS. 8a and 8b.

The first network node 111 may comprise an input and output interface 800 configured to communicate e.g. with the second network node 112 and the UE 120. The input and output interface 800 may comprise a wireless receiver not shown and a wireless transmitter not shown.

The first network node 111 is further configured to, e.g. by means of an obtaining unit 810 in first network node 111, obtain a Local RAN Node Identifier associated with a PLMN RAN Node ID, identifying the first network node 111.

The first network node 111 is further configured to, e.g. by means of a sending unit 820 in first network node 111, send the Local RAN Node Identifier and associated PLMN RAN Node ID to be obtainable by the second network node 112.

The first network node 111 is further configured to, e.g. by means of a suspending unit 830 in first network node 111, suspend the UE 120 from connected state into inactive state, and send to the UE 120 an identifier adapted to comprise a UE Context ID and the associated Local RAN Node Identifier. The UE Context ID is adapted to identify the UE Context associated with the UE 120. The UE Context ID, Local RAN Node Identifier and associated PLMN RAN Node ID is adapted to assist the second network node 112 to obtain the UE Context for the resuming of the UE 120 into connected state, wherein a connection is to be provided by the second network node 112.

The identifier may be represented by an I-RNTI.

In some embodiments, the Local RAN Node Identifier and associated PLMN RAN Node ID are adapted to be sent to any one out of: The second network node 112, or the second network node 112 via a control entity, sharing the Local RAN Node Identifier and associated PLMN RAN Node ID with the second network node 112.

The first network node 111 may further be configured to, e.g. by means of the sending unit 820 in first network node 111, send the Local RAN Node Identifier and associated PLMN RAN Node ID to be obtainable by the second network node 112 by sharing the Local RAN Node Identifier and associated PLMN RAN Node ID with neighbour network nodes, which neighbour network nodes are adapted to comprise the second network node 112.

The second network node 112 may be adapted to be a neighbour node to the first network node 111.

Figure 8A:
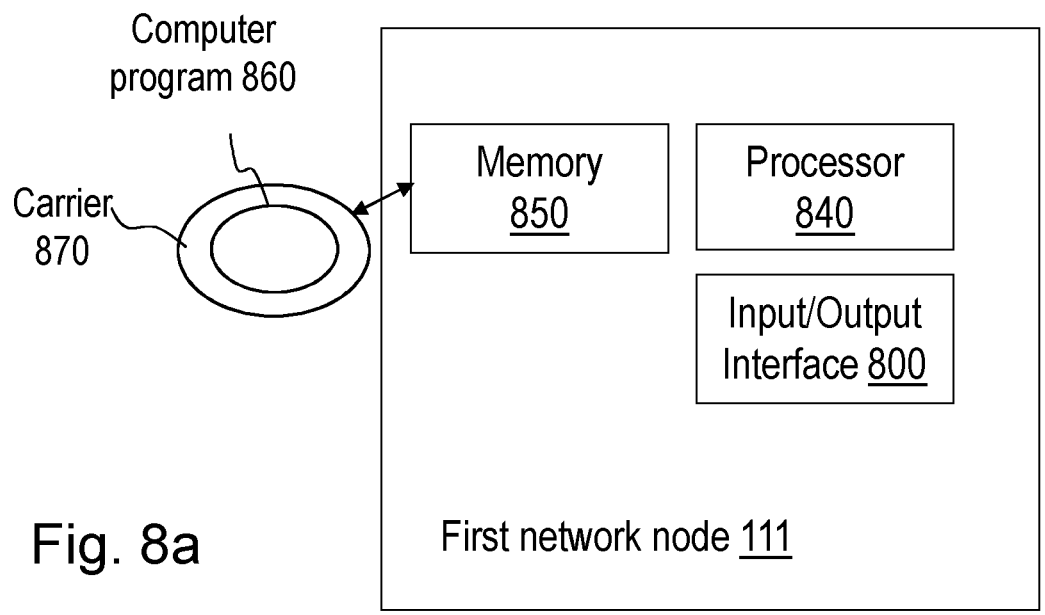
FIGS. 8 *a* and *b* are a schematic block diagrams illustrating embodiments of a first network node.
Figure 8B:
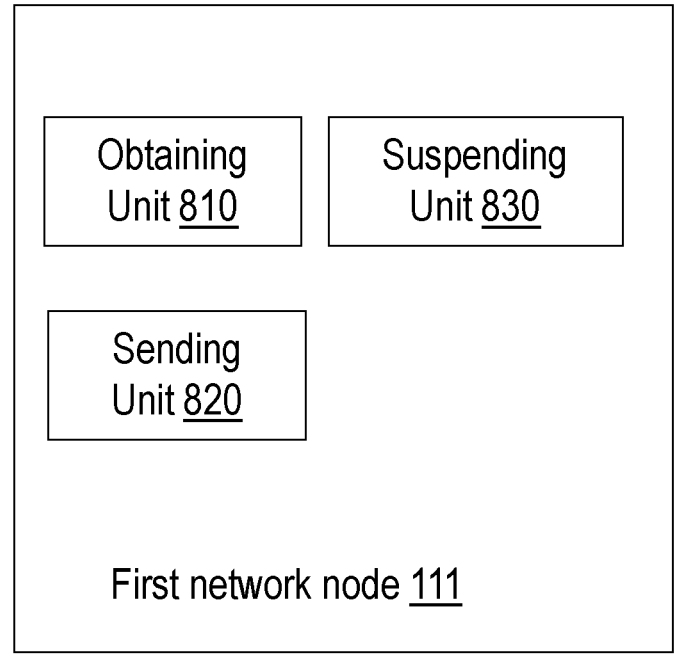

The embodiments herein may be implemented through a respective processor or one or more processors, such as the processor 840 of a processing circuitry in the first network node 111, depicted in FIG. 8a together with computer program code for performing the functions and actions of the embodiments herein. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to first network node 111.

The first network node 111 may further comprise a memory 850 comprising one or more memory units. The memory comprises instructions executable by the processor in the first network node 111. The memory 850 is arranged to be used to store e.g. IDs, table entries, information, data, configurations, and applications to perform the methods herein when being executed in the first network node 111.

In some embodiments, a computer program 860 comprises instructions, which when executed by the at least one processor, cause the at least one processor of the first network node 111, to perform the actions above.

In some embodiments, a carrier 870 comprises the computer program 860, wherein the carrier is one of an electronic signal, an optical signal, an electromagnetic signal, a magnetic signal, an electric signal, a radio signal, a microwave signal, or a computer-readable storage medium.

Figure 9A:
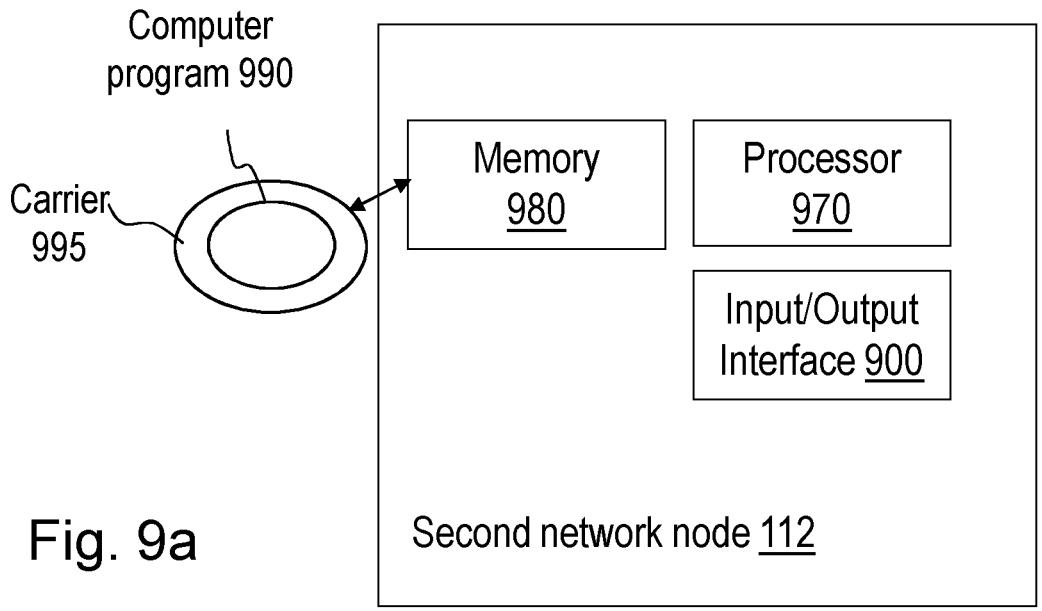
FIGS. 9 *a* and *b* are a schematic block diagrams illustrating embodiments of a second network node.
Figure 9B:
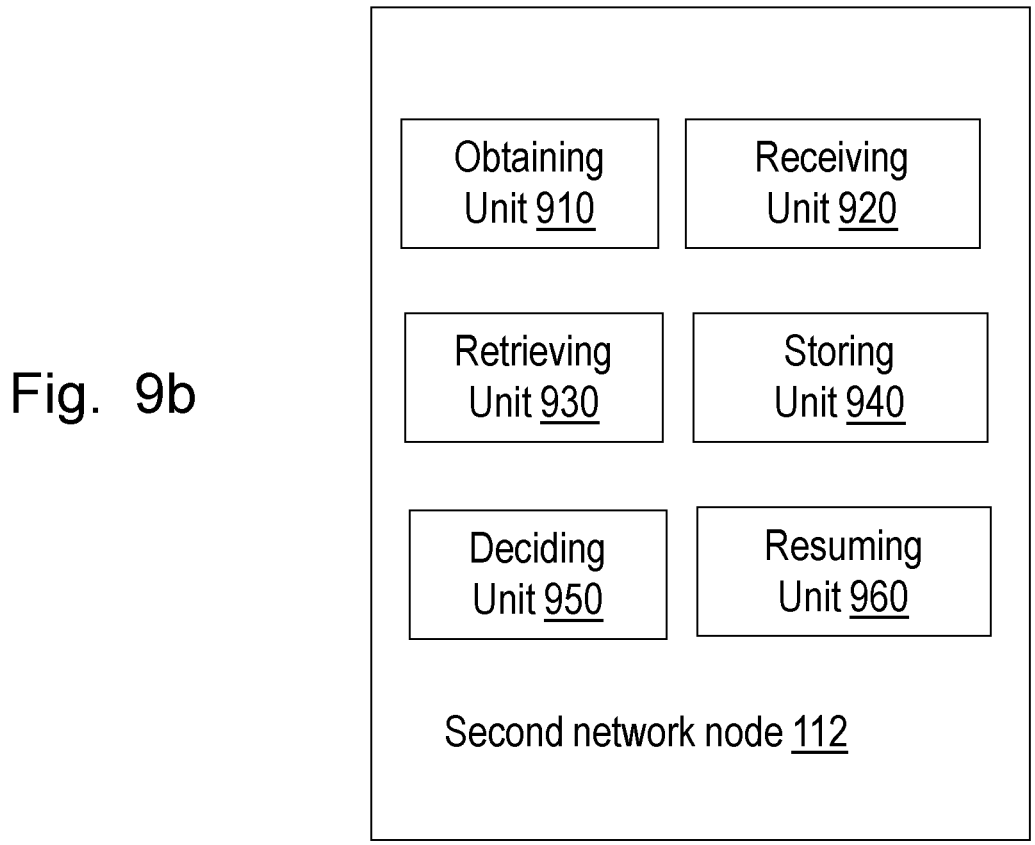

To perform the method actions above the second network node 112 is configured to enable a resume of the UE 120 in inactive state into connected state in the RAN 100, and may comprise the arrangement depicted in FIGS. 9a and 9b.

The second network node 112 may comprise an input and output interface 900 configured to communicate e.g. with the first network node 111 and the UE 120. The input and output interface 900 may comprise a wireless receiver not shown and a wireless transmitter not shown.

The second network node 112 is further configured to, e.g. by means of a obtaining unit 910 in the second network node 112, obtain a Local RAN Node Identifier and associated PLMN RAN Node ID adapted to identify a first network node 111 serving the UE 120 in connected state before being suspended into inactive state.

The second network node 112 is further configured to, e.g. by means of a receiving unit 920 in the second network node 112, receive a resume request message from the UE 120. The resume request message is adapted to comprise an identifier comprising a UE Context ID and the associated Local RAN Node Identifier. The UE Context ID is adapted to identify a UE Context associated with the UE 120.

The second network node 112 is further configured to, e.g. by means of a retrieving unit 930 in the second network node 112, retrieve the Local RAN Node Identifier from the UE Context ID.

The second network node 112 is further configured to, e.g. by means of the obtaining unit 910 in the second network node 112, obtain the associated PLMN RAN Node ID based on the Local RAN Node Identifier retrieved from the UE Context ID.

The second network node 112 is further configured to, e.g. by means of the obtaining unit 910 in the second network node 112, based on the obtained PLMN RAN Node ID, obtain the UE Context from the first network node 111.

The second network node 112 may further be configured to, e.g. by means of a storing unit 940 in the second network node 112, store the Local RAN Node Identifier and associated PLMN RAN Node ID as an entry in a table.

The second network node 112 may further be configured to, e.g. by means of the obtaining unit 910 in the second network node 112, obtain the associated PLMN RAN Node ID based on the Local RAN Node Identifier retrieved from the UE Context ID by reading the table.

The second network node 112 may in some embodiments be further be configured to, e.g. by means of a deciding unit 950 in the second network node 112, based on the obtained PLMN RAN Node ID, decide whether or not an interface connectivity is available to the first network node 111, according e.g. to any one out of: an XnAP interface, or an X2AP interface, or an NGAP interface, or an S1AP interface. In these embodiments, the second network node 112 is further is configured to, e.g. by means of the obtaining unit 910 in the second network node 112, obtain the UE Context from the first network node 111 by:

When an interface connectivity is available to the first network node 111, request e.g. via the XnAP or X2AP connectivity, a UE Context for the UE 120 that has sent the resume request message comprising the UE Context ID, and when an interface connectivity is not available to the first network node 111, trigger a procedure to setup an interface connectivity to the first network node 111 and request via the interface connectivity when set up, a UE Context for the UE 120 that has sent the resume request message comprising the UE Context ID.

The second network node 112 may further be configured to, e.g. by means of the resuming unit 960 in the second network node 112, based on a UE Context received from the first network node 111, resume the inactive state UE 120 into connected state by providing a connection with the UE120.

The Local RAN Node Identifier and associated Public Land Mobile Network, PLMN, RAN Node ID may be adapted to be obtained from any one out of: the first network node 111 or from the first network node 111 via a control entity, sharing the Local RAN Node Identifier and associated PLMN RAN Node ID with the second network node 112.

The second network node 112 may be adapted to be a neighbour node to the first network node 111.

The embodiments herein may be implemented through a respective processor or one or more processors, such as the processor 970 of a processing circuitry in the second network node 112, depicted in FIG. 9a together with computer program code for performing the functions and actions of the embodiments herein. The program code mentioned above may also be provided as a computer program product, for instance in the form of a data carrier carrying computer program code for performing the embodiments herein when being loaded into the second network node 112. One such carrier may be in the form of a CD ROM disc. It is however feasible with other data carriers such as a memory stick. The computer program code may furthermore be provided as pure program code on a server and downloaded to the second network node 112.

The electronic device 120 may further comprise a memory 980 comprising one or more memory units. The memory comprises instructions executable by the processor in the second network node 112. The memory 980 is arranged to be used to store e.g. IDs, table entries, information, data, configurations, and applications to perform the methods herein when being executed in the second network node 112.

In some embodiments, a computer program 990 comprises instructions, which when executed by the at least one processor, cause the at least one processor of the second network node 112, to perform the actions above.

In some embodiments, a carrier 995 comprises the computer program 990, wherein the carrier is one of an electronic signal, an optical signal, an electromagnetic signal, a magnetic signal, an electric signal, a radio signal, a microwave signal, or a computer-readable storage medium.

It shall be noted that the nodes mentioned herein may be arranged as separate nodes or may be collocated within one or more nodes in the communications network. When a plurality of nodes are collocated in one node, the single node may be configured to perform the actions of each of the collocated nodes.

Further Extensions and Variations

Figure 10:
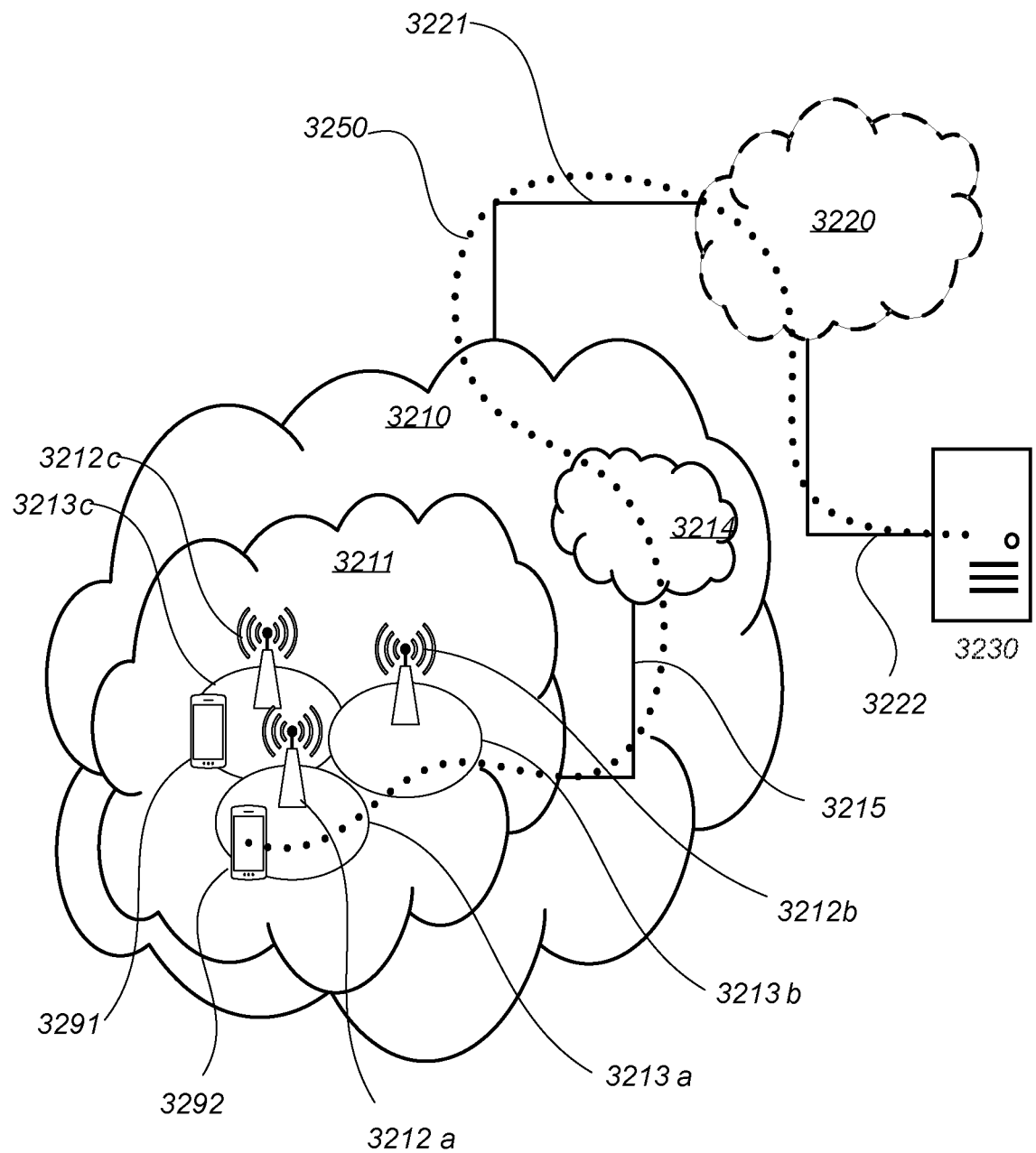
FIG. 10 schematically illustrates a telecommunication network connected via an intermediate network to a host computer.

With reference to FIG. 10, in accordance with an embodiment, a communication system includes telecommunication network 1910, such as a 3GPP-type cellular network, which comprises access network 1911, such as a radio access network, and core network 1914. Access network 1911 comprises a plurality of base stations 1912a, 1912b, 1912c, e.g. the first and second network nodes 111, 112, such as NBs, eNBs, gNBs or other types of wireless access points, each defining a corresponding coverage area 1913a, 1913b, 1913c. Each base station 1912a, 1912b, 1912c is connectable to core network 1914 over a wired or wireless connection 1915. A first UE 1991, such as the UE 120, located in coverage area 1913c is configured to wirelessly connect to, or be paged by, the corresponding base station 1912c. A second UE 1992 in coverage area 1913a is wirelessly connectable to the corresponding base station 1912a. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which may be embodied in the hardware and/or software of a standalone server, a cloud-implemented server, a distributed server or as processing resources in a server farm. Host computer 1930 may be under the ownership or control of a service provider, or may be operated by the service provider or on behalf of the service provider. Connections 1921 and 1922 between telecommunication network 1910 and host computer 1930 may extend directly from core network 1914 to host computer 1930 or may go via an optional intermediate network 1920. Intermediate network 1920 may be one of, or a combination of more than one of, a public, private or hosted network;

intermediate network 1920, if any, may be a backbone network or the Internet; in particular, intermediate network 1920 may comprise two or more sub-networks (not shown).

The communication system of FIG. 10 as a whole enables connectivity between the connected UEs 1991, 1992 and host computer 1930. The connectivity may be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 may be transparent in the sense that the participating communication devices through which OTT connection 1950 passes are unaware of routing of uplink (UL) and downlink (DL) communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Example implementations, in accordance with an embodiment, of the UE, base station and host computer discussed in the preceding paragraphs will now be described with reference to FIG. 11. In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which may have storage and/or processing capabilities. In particular, processing circuitry 2018 may comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 may be operable to provide a service to a remote user, such as UE 2030 connecting via OTT connection 2050 terminating at UE 2030 and host computer 2010. In providing the service to the remote user, host application 2012 may provide user data which is transmitted using OTT connection 2050.

Communication system 2000 further includes base station 2020 provided in a telecommunication system and comprising hardware 2025 enabling it to communicate with host computer 2010 and with UE 2030. Hardware 2025 may include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 11) served by base station 2020. Communication interface 2026 may be configured to facilitate connection 2060 to host computer 2010. Connection 2060 may be direct or it may pass through a core network (not shown in FIG. 11) of the telecommunication system and/or through one or more intermediate networks outside the telecommunication system. In the embodiment shown, hardware 2025 of base station 2020 further includes processing circuitry 2028, which may comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 further includes UE 2030 already referred to. Its hardware 2035 may include radio interface 2037 configured to set up and maintain wireless connection 2070 with a base station serving a coverage area in which UE 2030 is currently located. Hardware 2035 of UE 2030 further includes processing circuitry 2038, which may comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 may be operable to provide a service to a human or non-human user via UE 2030, with the support of host computer 2010. In host computer 2010, an executing host application 2012 may communicate with the executing client application 2032 via OTT connection 2050 terminating at UE 2030 and host computer 2010. In providing the service to the user, client application 2032 may receive request data from host application 2012 and provide user data in response to the request data. OTT connection 2050 may transfer both the request data and the user data. Client application 2032 may interact with the user to generate the user data that it provides.

Figure 11:
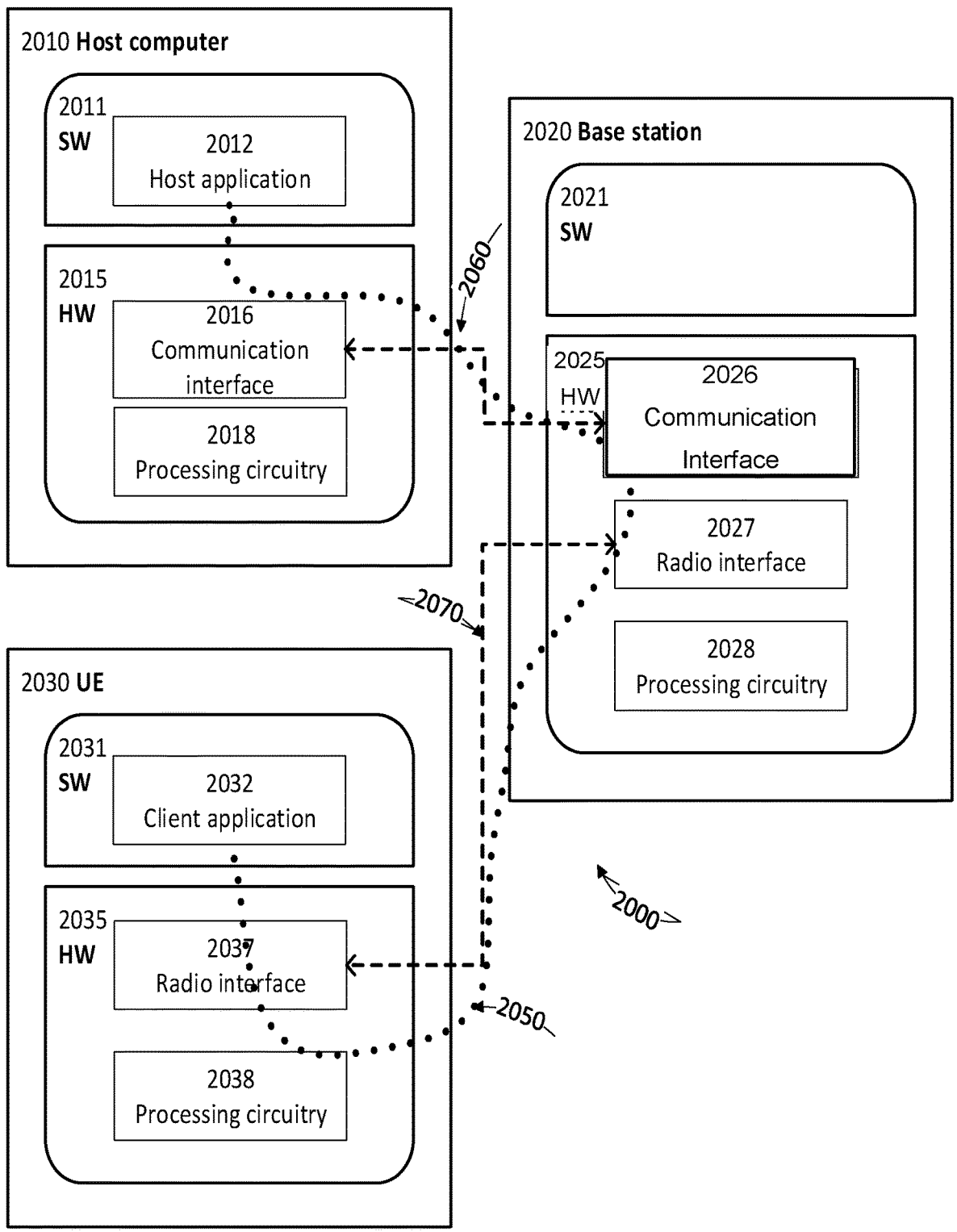
FIG. 11 is a generalized block diagram of a host computer communicating via a base station with a user equipment over a partially wireless connection.

It is noted that host computer 2010, base station 2020 and UE 2030 illustrated in FIG. 11 may be similar or identical to host computer 1930, one of base stations 1912*a*, 1912*b*, 1912*c* and one of UEs 1991, 1992 of FIG. 10, respectively. This is to say, the inner workings of these entities may be as shown in FIG. 11 and independently, the surrounding network topology may be that of FIG. 10.

In FIG. 11, OTT connection 2050 has been drawn abstractly to illustrate the communication between host computer 2010 and UE 2030 via base station 2020, without explicit reference to any intermediary devices and the precise routing of messages via these devices. Network infrastructure may determine the routing, which it may be configured to hide from UE 2030 or from the service provider operating host computer 2010, or both. While OTT connection 2050 is active, the network infrastructure may further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment. More precisely, the teachings of these embodiments may improve end-to-end time synchronization with multiple time-domains and thereby provide benefits such as improved performance and efficiency of the communications network, in particular when forward time signals from multiple time domains.

A measurement procedure may be provided for the purpose of monitoring data rate, latency and other factors on which the one or more embodiments improve. There may further be an optional network functionality for reconfiguring OTT connection 2050 between host computer 2010 and UE 2030, in response to variations in the measurement results. The measurement procedure and/or the network functionality for reconfiguring OTT connection 2050 may be implemented in software 2011 and hardware 2015 of host computer 2010 or in software 2031 and hardware 2035 of UE 2030, or both. In embodiments, sensors (not shown) may be deployed in or in association with communication devices through which OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of OTT connection 2050 may include message format, retransmission settings, preferred routing etc.; the reconfiguring need not affect base station 2020, and it may be unknown or imperceptible to base station 2020. Such procedures and functionalities may be known and practiced in the art. In certain embodiments, measurements may involve proprietary UE signaling facilitating host computer 2010's measurements of throughput, propagation times, latency and the like. The measurements may be implemented in that software 2011 and 2031 causes messages to be transmitted, in particular empty or 'dummy' messages, using OTT connection 2050 while it monitors propagation times, errors etc.

Figures 12, 13:
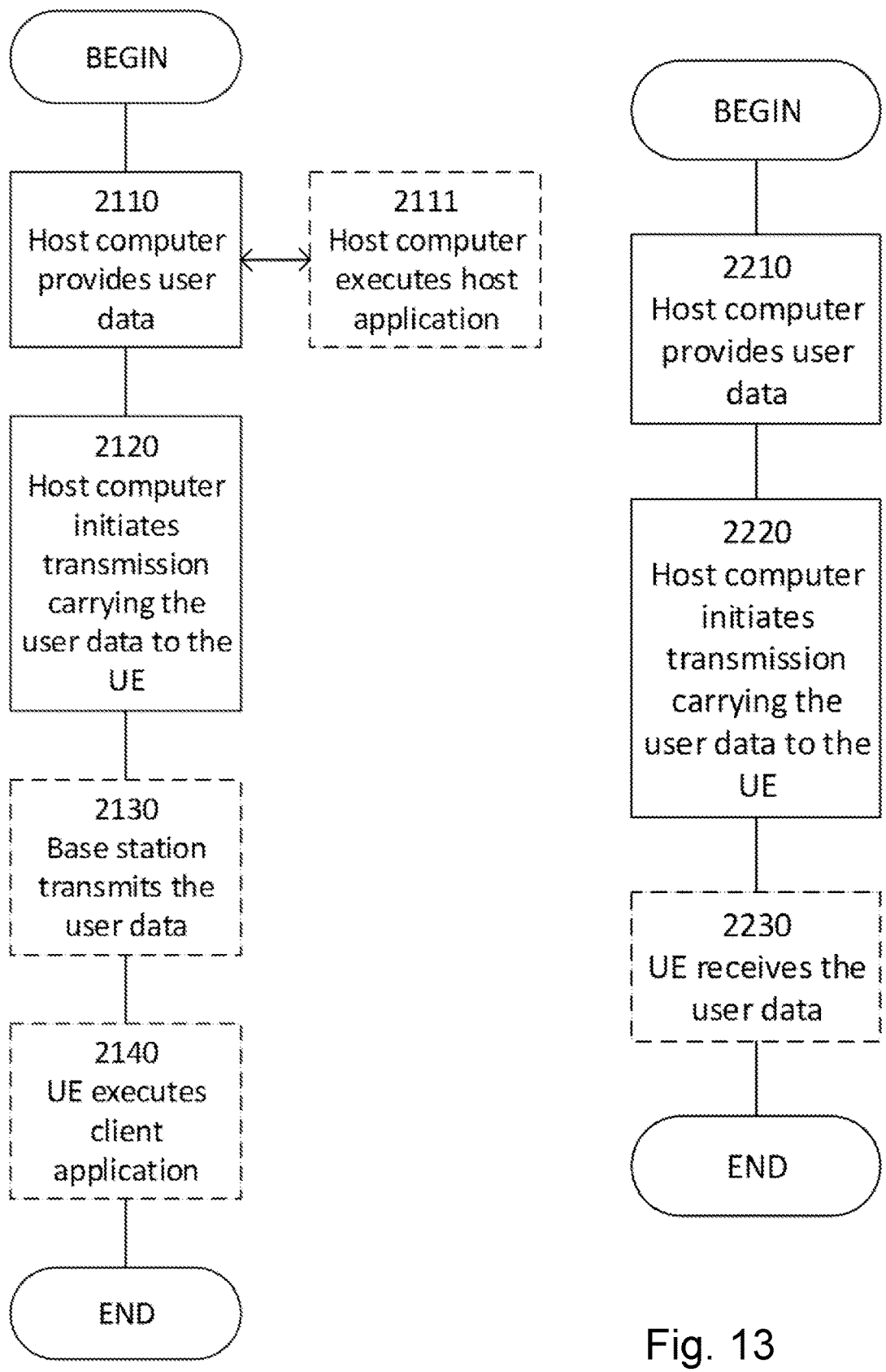
FIGS. 12-15 are flowcharts illustrating methods implemented in a communication system including a host computer, a base station and a user equipment.

FIG. 12 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 10 will be included in this section. In step 2110, the host computer provides user data. In substep 2111 (which may be optional) of step 2110, the host computer provides the user data by executing a host application. In step 2120, the host computer initiates a transmission carrying the user data to the UE. In step 2130 (which may be optional), the base station transmits to the UE the user data which was carried in the transmission that the host computer initiated, in accordance with the teachings of the embodiments described throughout this disclosure. In step 2140 (which may also be optional), the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 11 will be included in this section. In step 2210 of the method, the host computer provides user data. In an optional substep (not shown) the host computer provides the user data by executing a host application. In step 2220, the host computer initiates a transmission carrying the user data to the UE. The transmission may pass via the base station, in accordance with the teachings of the embodiments described throughout this disclosure. In step 2230 (which may be optional), the UE receives the user data carried in the transmission.

Figure 14:
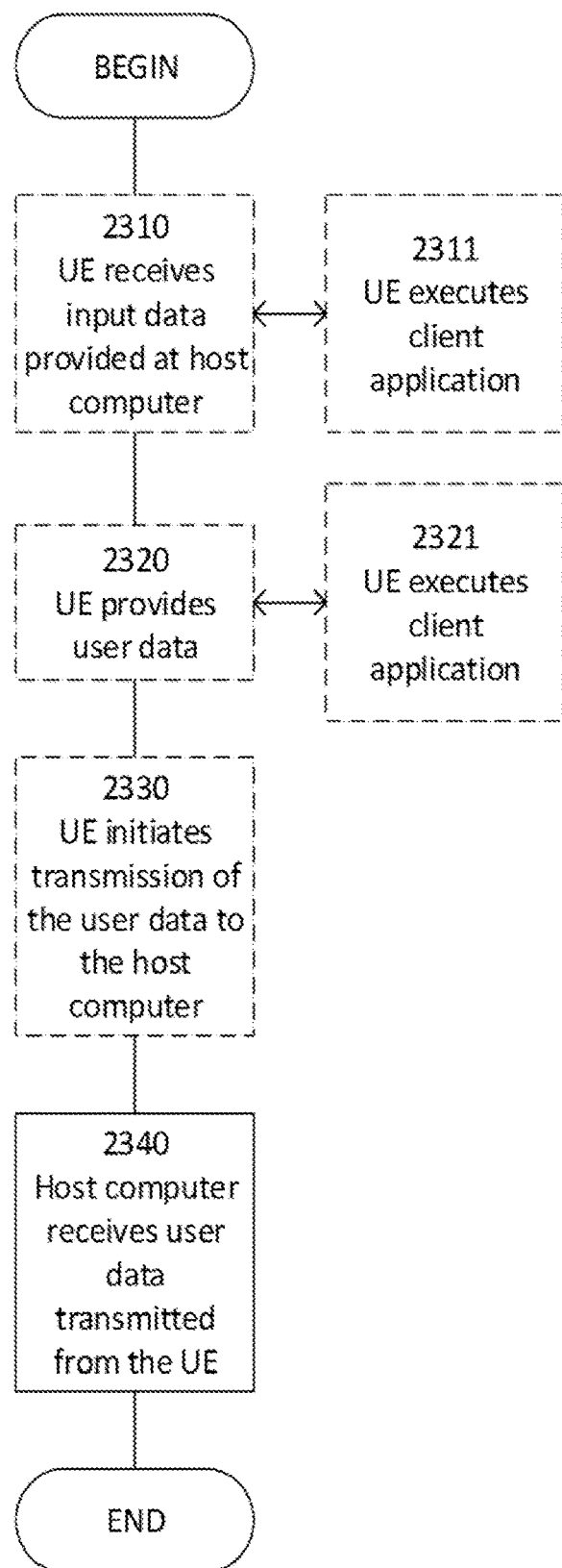

FIG. 14 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 14 will be included in this section. In step 2310 (which may be optional), the UE receives input data provided by the host computer. Additionally or alternatively, in step 2320, the UE provides user data. In substep 2321 (which may be optional) of step 2320, the UE provides the user data by executing a client application. In substep 2311 (which may be optional) of step 2310, the UE executes a client application which provides the user data in reaction to the received input data provided by the host computer. In providing the user data, the executed client application may further consider user input received from the user. Regardless of the specific manner in which the user data was provided, the UE initiates, in substep 2330 (which may be optional), transmission of the user data to the host computer. In step 2340 of the method, the host computer receives the user data transmitted from the UE, in accordance with the teachings of the embodiments described throughout this disclosure.

Figure 15:
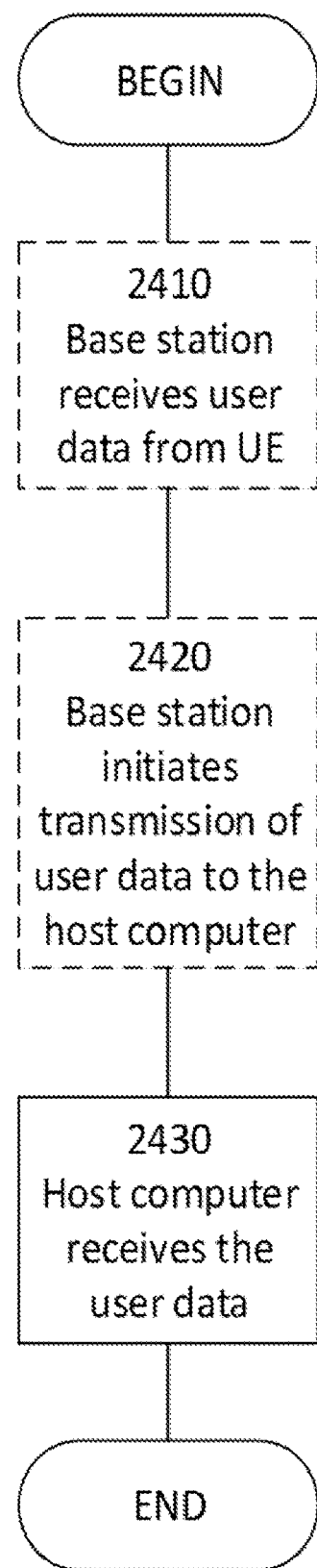

FIG. 15 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 15 will be included in this section. In step 2410 (which may be optional), in accordance with the teachings of the embodiments described throughout this disclosure, the base station receives user data from the UE. In step 2420 (which may be optional), the base station initiates transmission of the received user data to the host computer. In step 2430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The invention claimed is:

1. A method performed by a first network node for assisting a second network node in resuming of a User Equipment, UE, in inactive state into connected state in a Radio Access Network, RAN, the method comprising:
obtaining a Local RAN Node Identifier, associated with a Public Land Mobile Network, PLMN, RAN Node ID, identifying the first network node,
sending the Local RAN Node Identifier and associated PLMN RAN Node ID to be obtainable by the second network node, which comprises sharing the Local RAN Node Identifier and associated PLMN RAN Node ID with neighbour network nodes, which neighbour network nodes comprises the second network node,
suspending the UE from connected state into inactive state, and sending to the UE an identifier comprising a UE Context ID and the associated Local RAN Node Identifier, which UE Context ID identifies the UE Context associated with the UE, which UE Context ID, Local RAN Node Identifier and associated PLMN RAN Node ID will assist the second network node to obtain the UE Context for the resuming of the UE into connected state, wherein a connection is to be provided by the second network node.

2. The method according to claim 1, wherein the Local RAN Node Identifier and associated PLMN RAN Node ID are sent to any one out of:
the second network node, or
the second network node via a control entity, sharing the Local RAN Node Identifier and associated PLMN RAN Node ID with the second network node.

3. The method according to the claim 1, wherein the identifier is represented by an Inactive Radio Network Temporary Identifier, I-RNTI.

4. A method performed by a second network node for enabling a resume of a User Equipment, UE, in inactive state into connected state in a Radio Access Network, RAN, the method comprising:
obtaining a Local RAN Node Identifier, and associated Public Land Mobile Network, PLMN, RAN Node ID identifying a first network node serving the UE in connected state before being suspended into inactive state,
receiving a resume request message from the UE, which resume request message comprises an identifier comprising a UE Context ID and the associated Local RAN Node Identifier, which UE Context ID identifies a UE Context associated with the UE, and which Local RAN Node Identifier identifies the RAN node hosting the UE Context,
retrieving the Local RAN Node Identifier from the identifier,
obtaining the associated PLMN RAN Node ID based on the Local RAN Node Identifier retrieved from the identifier,
based on the obtained PLMN RAN Node ID, obtaining the UE Context from the first network node.

5. The method according to claim 4, further comprising:
storing the Local RAN Node Identifier and associated PLMN RAN Node ID as an entry in a table.

6. The method according to claim 5, wherein obtaining the associated PLMN, RAN Node ID based on the Local RAN Node Identifier retrieved from the identifier is performed by reading the table.

7. The method according to the claim 4, further comprising:
based on the obtained PLMN RAN Node ID, deciding whether or not an interface connectivity is available to the first network node, according e.g. to any one out of an Xn Application Protocol, XnAP, interface, or an X2 Application Protocol, X2AP, interface, or a Next Generation Application Protocol, NGAP, interface, or an, S1 Application Protocol, S1AP, interface, and
wherein obtaining the UE Context from the first network node is performed by:
when an interface connectivity is available to the first network node, requesting e.g. via the XnAP connectivity, a UE Context for the UE that has sent the resume request message comprising the UE Context ID, and
when an interface connectivity is not available to the first network node, triggering a procedure to setup an interface connectivity to the first network node and requesting via the interface connectivity when set up, a UE Context for the UE that has sent the resume request message comprising the UE Context ID.

8. The method according to the claim 4, further comprising:
based on a UE Context received from the first network node, resuming the inactive state UE into connected state by providing a connection with the UE.

9. The method according to the claim 4, wherein the Local RAN Node Identifier and associated Public Land Mobile Network, PLMN, RAN Node ID are obtained from any one out of: the first network node or from the first network node via a control entity, sharing the Local RAN Node Identifier and associated PLMN RAN Node ID with the second network node.

10. A first network node configured to assist a second network node in resuming of a User Equipment, UE, in inactive state into connected state in a Radio Access Network, RAN, the first network node further being configured to:
obtain a Local RAN Node Identifier associated with a Public Land Mobile Network, PLMN, RAN Node ID, identifying the first network node,
send the Local RAN Node Identifier and associated PLMN RAN Node ID to be obtainable by the second network node, which comprises sharing the Local RAN Node Identifier and associated PLMN RAN Node ID with neighbor network nodes, which neighbor network nodes are adapted to comprise the second network node,
suspend the UE from connected state into inactive state, and send to the UE (120) an identifier adapted to comprise a UE Context ID and the associated Local RAN Node Identifier, which UE Context ID is adapted to identify the UE Context associated with the UE,
which UE Context ID, Local RAN Node Identifier and associated PLMN RAN Node ID are adapted to assist the second network node to obtain the UE Context for the resuming of the UE into connected state, wherein a connection is to be provided by the second network node.

11. The first network node according to claim 10, wherein the Local RAN Node Identifier and associated PLMN RAN Node ID are adapted to be sent to any one out of:
the second network node, or
the second network node via a control entity, sharing the Local RAN Node Identifier and associated PLMN RAN Node ID with the second network node.

12. The first network node according to the claim 10, wherein the identifier is adapted to be represented by an Inactive Radio Network Temporary Identifier, I-RNTI.

13. A second network node configured to enable a resume of a User Equipment, UE, in inactive state into connected state in a Radio Access Network, RAN, the second network node being further configured to:
obtain a Local RAN Node Identifier and associated Public Land Mobile Network, PLMN, RAN Node ID adapted to identify a first network node serving the UE in connected state before being suspended into inactive state,
receive a resume request message from the UE, which resume request message is adapted to comprise an identifier comprising a UE Context ID and the associated Local RAN Node Identifier, which UE Context ID is adapted to identify a UE Context associated with the UE, and which Local RAN Node Identifier is adapted to identify the RAN node hosting the UE Context,
retrieve the Local RAN Node Identifier from the identifier, obtain the associated PLMN RAN Node ID based on the Local RAN Node Identifier retrieved from the identifier, and based on the obtained PLMN RAN Node ID, obtain the UE Context from the first network node.

14. The second network node according to claim 13, further being configured to:

store the Local RAN Node Identifier and associated PLMN RAN Node ID as an entry in a table.

15. The second network node according to claim 14, further being configured to: obtain the associated PLMN, RAN Node ID based on the Local RAN Node Identifier retrieved from the identifier by reading the table.

16. The second network node according to the claim 13, further being configured to:

based on the obtained PLMN RAN Node ID, decide whether or not an interface connectivity is available to the first network node, according to any one out of: an Xn Application Protocol, XnAP, interface, or an X2 Application Protocol, X2AP, interface, or a Next Generation Application Protocol, NGAP, interface, or an, S1 Application Protocol, S1AP, interface, and wherein the second network node is further is configured to obtain the UE Context from the first network node by:

when an interface connectivity is available to the first network node, request e.g. via the XnAP connectivity, a UE Context for the UE that has sent the resume request message comprising the UE Context ID, and when an interface connectivity is not available to the first network node, trigger a procedure to setup an interface connectivity to the first network node and request via the interface connectivity when set up, a UE Context for the UE that has sent the resume request message comprising the UE Context ID.

17. The second network node according to the claim 13, further being configured to:

based on a UE Context received from the first network node, resume the inactive state UE into connected state by providing a connection with the UE.

18. The second network node according to the claim 13, wherein the Local RAN Node Identifier and associated Public Land Mobile Network, PLMN, RAN Node ID are adapted to be obtained from any one out of: the first network node or from the first network node via a control entity, sharing the Local RAN Node Identifier and associated gNB ID with the second network node.

* * * * *